United States Patent
Kanai et al.

[11] Patent Number: 6,034,666
[45] Date of Patent: Mar. 7, 2000

[54] SYSTEM AND METHOD FOR DISPLAYING A COLOR PICTURE

[75] Inventors: Akira Kanai; Masaki Yamakawa, both of Tokyo, Japan

[73] Assignee: Mitsubishi Denki Kabushiki Kaisha, Tokyo, Japan

[21] Appl. No.: 08/905,277

[22] Filed: Aug. 6, 1997

[30] Foreign Application Priority Data

Oct. 16, 1996 [JP] Japan .................................. 8-273611

[51] Int. Cl.[7] ...................................................... G09G 5/02
[52] U.S. Cl. ........................................... 345/150; 348/742
[58] Field of Search ................................ 345/22, 88, 150, 345/151, 204; 348/742, 743; 358/56, 98

[56] References Cited

U.S. PATENT DOCUMENTS

| | | | |
|---|---|---|---|
| 3,935,590 | 1/1976 | Kaji et al. .................................. | 358/56 |
| 4,604,992 | 8/1986 | Sato ........................................... | 128/6 |
| 4,845,553 | 7/1989 | Konomura et al. ........................ | 358/98 |
| 4,875,091 | 10/1989 | Yamada et al. ........................... | 358/42 |
| 4,882,619 | 11/1989 | Hasegawa et al. ........................ | 358/55 |
| 5,081,524 | 1/1992 | Tsuruoka et al. .......................... | 358/32 |
| 5,528,262 | 6/1996 | McDowall et al. ...................... | 345/151 |
| 5,528,317 | 6/1996 | Gove et al. ............................... | 348/743 |
| 5,574,516 | 11/1996 | Kanai et al. .............................. | 348/742 |
| 5,648,825 | 7/1997 | Kanai et al. .............................. | 348/743 |
| 5,654,756 | 8/1997 | Takahashi et al. ....................... | 348/268 |
| 5,737,036 | 4/1998 | Kanai et al. .............................. | 348/742 |
| 5,835,164 | 11/1998 | Kanai et al. .............................. | 348/742 |

FOREIGN PATENT DOCUMENTS

A-6-78319   3/1994   Japan .
A-6161383   6/1994   Japan .

*Primary Examiner*—Matthew Luu
*Assistant Examiner*—Jeff Piziali

[57] ABSTRACT

A system for displaying a color picture. This system has a field sequential signal generator for receiving and storing a color picture signal, which includes a plurality of signal components per field, at a first rate and sequentially sending the plurality of signal components, as a field sequential signal, at a second rate which is higher than the first rate; a picture display for displaying a monochromatic picture based on each of the signal components; a coloring device for coloring light emitted from the monochromatic picture displayed on the picture display; and a controller for sending a vertical sync signal, which includes a plurality of vertical sync pulses corresponding to the signal components respectively, to the picture display. The controller controls a timing at which each of the vertical sync pulses is sent to the picture display in such a way that respective time intervals between when the vertical sync pulse is sent from the controller to the picture display and when the signal component is sent from the field sequential signal generator to the picture display are equal.

18 Claims, 34 Drawing Sheets

INTERLACE
SCANNING
(2 FIELDS = 1 FRAME)

NON-INTERLACE
SCANNING

FIRST FIELD
(30 FIELDS PER SECOND)

SECOND FIELD
(30 FIELDS PER SECOND)

SYSTEM AND METHOD FOR DISPLAYING A COLOR PICTURE

BACKGROUND OF THE INVENTION

The present invention relates to a system and a method for displaying a color picture, in which primary color signals are converted into a field sequential signal, monochromatic pictures are sequentially displayed on a display screen of a monochromatic picture display device such as a monochromatic CRT, and light from the display screen passes through a coloring device such as a rotary color filter to provide a color picture display.

A prior art system for displaying a color picture is disclosed, for example, in Japanese Patent Kokai Publication Nos. 161383/1994. In the publication, a color picture signal for one frame is delivered as a field sequential signal RGB, which is a serial signal having a rate three times higher than the original signal. Specifically, the monochromatic picture is displayed in the sequence of the primary signals of R (odd field), G (odd field), B (odd field), R (even field), G (even field) and B (even field), and the vertical deflection for the green color G is shifted by one-half the horizontal scan period H (i.e., H/2) in opposite directions between the odd field and the even field.

FIG. 22 is a block diagram schematically showing a construction of the above-mentioned prior art system.

Referring to FIG. 22, the system has a field sequential signal generator 1, a reference clock generator 2 which generates a reference clock, a monochromatic picture display device 4 which displays a monochromatic picture in response to a field sequential signal RGB delivered from the field sequential signal generator 1, a coloring device 5 which colors the light emitted from the monochromatic picture displayed on the display screen of the monochromatic picture display device 4, and a controller 19 which controls the various components mentioned above.

FIG. 23 is a block diagram schematically showing a construction of the field sequential signal generator 1 of FIG. 22.

Referring to FIG. 23, the field sequential signal generator 1 has a storage section 10 and a switching section 9.

The storage section 10 has A/D converters 6R1, 6R2, 6G1, 6G2, 6B1 and 6B2 which convert inputted primary color signals R, G and B into digital data respectively, memories 7R1, 7R2, 7G1, 7G2, 7B1 and 7B2 which store data delivered from the A/D converters 6R1, 6R2, 6G1, 6G2, 6B1 and 6B2 respectively, and D/A converters 8R1, 8R2, 8G1, 8G2, 8B1 and 8B2 which convert data read out from the memories 7R1, 7R2, 7G1, 7G2, 7B1 and 7B2 into analog signals respectively. A customary single board memory incapable of permitting a simultaneous write-in and read-out is used for each of the memories 7R1, 7R2, 7G1, 7G2, 7B1 and 7B2.

The switching section 9 selects one of outputs from the D/A converters 8R1, 8R2, 8G1, 8G2, 8B1 and 8B2 of the storage section 10.

FIG. 24 is a block diagram schematically showing a construction of the controller 19 shown in FIG. 22.

Referring to FIG. 24, the controller 19 has a horizontal frequency converter 11 which simply converts a horizontal sync signal HD into a triple rate horizontal sync signal 3H, and a vertical frequency converter 12 which simply converts a vertical sync signal VD into a triple rate vertical sync signal 3V. The controller 19 also has a write-in control circuit 13 which controls a write-in operation of data into memories 7R1, 7R2, 7G1, 7G2, 7B1 and 7B2 of the storage section 10 of the field sequential signal generator 1, and a read-out control circuit 14 which controls a read-out operation of data from the memories 7R1, 7R2, 7G1, 7G2, 7B1 and 7B2. Additionally, the controller 19 has a display control circuit 15 which controls the monochromatic picture display device 4, a coloring control circuit 16 which controls the coloring device 5, a field discriminator 17 which discriminates a field into which a picture signal is to be written into, and a shift signal generator circuit 18 which generates a signal to shift the deflection up and down in the vertical direction.

The field discriminator 17 discriminates a particular memory into which the data is written and a particular field of one frame from which the data is derived, and also discriminates a particular field from which data is read out. This allows data to be read out from the same field in succession, and also allows the data to be read out in synchronism with the vertical sync signal.

FIG. 25 shows the monochromatic picture display device 4 shown in FIG. 22.

Referring to FIG. 25, the monochromatic picture display device 4 which is used to display the picture based on the field sequential signal RGB has a monochrome CRT 21 and a deflection control circuit 22.

FIG. 26 is a block diagram schematically showing the deflection control circuit 22 shown in FIG. 25 in detail.

Referring to FIG. 26, the deflection control circuit 22 has a vertical deflection shift circuit 23, a vertical deflection circuit 24, and a horizontal deflection circuit 25. A combination of the vertical deflection shift circuit 23 and the vertical deflection circuit 24 is effective to produce a vertical deflection pulse VP on the basis of a vertical control signal VS (i.e., 3VD) having a triple rate delivered from the display control circuit 15 of the controller 19. The horizontal deflection circuit 25 is effective to produce a horizontal deflection pulse HP on the basis of a horizontal control signal HS (i.e., 3 HD) having a triple rate delivered from the display control circuit 15 of the controller 19. Both of these pulses are effective to control the deflection of an electron beam in the monochromatic CRT 21.

FIG. 27 is a schematic view of a coloring device of FIG. 22.

Referring to FIG. 27, the coloring device 5 has a rotary color filter 28 having three filter sections corresponding to three primary colors R, G and B, a motor 27 which rotates the rotary color filter 28, and a motor control circuit 26 which delivers a motor control signal MS which is applied to the motor 27 on the basis of a coloring control signal CS delivered from the controller 19. The rotary color filter 28 is controlled so that it rotates in synchronism with a field sequential signal RGB in front of the display screen of the monochromatic CRT 21 in the monochromatic picture display device 4 in response to a signal from the controller 19 so that when a monochromatic picture is displayed on the monochromatic CRT 21, a filter section having a color which corresponds to the primary colors of the picture signals being displayed is located in front of the display screen.

FIGS. 28A and 28B are explanatory diagrams showing different television scanning schemes. FIG. 28A illustrates an interlace scanning in which two fields constitute a frame. In FIG. 28A, scanning lines in an odd field are shown by solid lines, while scanning lines in an even field are shown by broken lines. FIG. 28B illustrates a non-interlace scanning in which the scanning are conducted in the sequence of an arrangement of the scanning lines.

FIGS. 29A and 29B are explanatory diagrams illustrating the interlace scanning. In FIGS. 29A and 29B, an NTSC signal is chosen as an example of television signal. In FIG. 29A, scanning lines in a first field are shown by solid lines, while in FIG. 29B, scanning lines in a second field are shown by broken lines.

FIG. 30 is an explanatory diagram showing the timings of various signals and the position of the scanning lines which appear on the monochromatic picture display device 4 when the vertical correction pulse SS is not inputted to the vertical deflection shift circuit 23 of FIG. 26, and FIG. 31 an explanatory diagram showing the vertical deflection pulses VP and the position of scanning lines which appear on the monochromatic picture display device 4, when the vertical correction pulse SS is not inputted to the vertical deflection shift circuit 23.

FIG. 32 is an explanatory diagram showing the timings of various signals and the position of the scanning lines which appear on the monochromatic picture display device 4, when the vertical correction pulse SS is inputted to the vertical deflection shift circuit 23, and FIG. 33 is an explanatory diagram showing the vertical deflection pulse and the position of the scanning lines which appear on the monochromatic picture display device 4, when the vertical correction pulse SS is inputted to the vertical deflection shift circuit 23.

The operation of the prior art picture display mentioned above will now be described. Referring to FIG. 22, the three primary color signals R, G and B which are separated from a television signal are inputted to the field sequential signal generator 1, and are then stored in the storage section 10 shown in FIG. 23 on the basis of write-in control signals W and W' and a clock ADC which are supplied from the controller 19. Within the storage section 10, the individual primary color signals R, G and B are converted into digital data in the different A/D converters 6R1, 6R2, 6G1, 6G2, 6B1 and 6B2, respectively, in synchronism with the clock ADC. The converted digital data are written into the memories 7R1, 7R2, 7G1, 7G2, 7B1 and 7B2 for storage on the basis of write-in control signals W and W' associated with these memories and the clock ADC.

Subsequently, data is read out from the memories 7R1, 7R2, 7G1, 7G2, 7B1 and 7B2 on the basis of read-out control signals R and R' and a memory read-out clock DAC which has a triple rate as compared with the write-in clock. The D/A converters 8R1, 8R2, 8G1, 8G2, 8B1 and 8B2 convert digital data which is delivered from the memories 7R1, 7R2, 7G1, 7G2, 7B1 and 7B2 into a corresponding analog signal using the clock DAC associated with the D/A converters 8R1, 8R2, 8G1, 8G2, 8B1 and 8B2. The field sequential signal generator 1 stores a picture data for one field in each of the memories 7R1, 7R2, 7G1, 7G2, 7B1 and 7B2. Specifically, the storage section 10 includes memories 7R1, 7G1 and 7B1 for the primary color signals of one field, and memories 7R2, 7G2 and 7B2 for the primary color signals of the other field so that the primary color signals for two fields can be stored. The memories 7R1, 7G1 and 7B1, and the memories 7R2, 7G2 and 7B2 alternately store the primary color signals for one field, and the combination of all these memories store one frame, namely, two fields. It is to be noted that during the time the data is read out from the memories 7R1, 7G1 and 7B1, the data is written into the remaining memories 7R2, 7G2 and 7B2.

Referring to FIG. 24, the controller 19 receives the reference clock signal CK delivered from the reference clock generator 2, the vertical sync signal VD and the horizontal sync signal HD, and delivers several control signals which control the memories 7R1, 7R2, 7G1, 7G2, 7B1 and 7B2. The reference clock generator 2 delivers the clock CK which is synchronized with the horizontal sync signal HD. In response to the horizontal sync signal HD and the vertical sync signal VD, the write-in control circuit 13 delivers write-in control signals W and W' which are synchronized with the clock CK, and a write-in clock ADC having a frequency which is one-third the frequency of the clock CK. In response to the signal 3H which is obtained by converting the horizontal sync signal HD into a signal having a triple frequency in the horizontal frequency converter 11 (and thus a pulse-like signal having a width narrower than that of the horizontal sync signal HD) and the signal 3V which is obtained by converting the vertical sync signal VD into a signal having a triple frequency in the vertical frequency converter circuit 12 (and which is thus pulse-like signal having a width narrower than that of the vertical sync signal VD), the read-out control circuit 14 delivers the read-out control signals R and R' which are synchronized with the clock CK and a read-out clock DAC having the same frequency as the clock CK.

Simultaneously, the read-out control circuit 14 delivers a control signal S which controls a switching section 9 so that the primary color signals can be switched in the sequence of the primary colors R, G and B, for example. In response to the signals 3H and 3V, the coloring control circuit 15 delivers a coloring control signal CS. Also, in response to the signals 3H and 3V, the shift signal generator circuit 18 delivers a vertical correction pulse SS, and the display control circuit 16 delivers a horizontal sync signal having a triple rate 3HD (i.e., HS) and a vertical sync signal having a triple rate 3VD (i.e., VS). Using these outputs from the controller 19, the field sequential signal generator 1 is controlled to deliver three signals of one field in succession.

In the conventional system mentioned above, a different picture can not be delivered every field. If it is attempted to deliver a different picture every field, a memory having nearly double capacity is required, increasing the cost. To avoid such the increase of cost, the same picture of one field is displayed three times in succession to achieve this, and the switching section 9 sequentially switches the picture signal in the original sequence of the primary colors R, G and B at an interval which is equal to one-third the interval between adjacent vertical sync signals VD's of the original signal. They are sequentially delivered as the signals for one field. Such control is performed by the RGB selection signal S from the controller 19. An output from the switching section 9 is fed, as the field sequential signal RGB, to the monochromatic picture display device 4 where the picture is displayed on the basis of the field sequential signal RGB. At this time, the scanning due to the vertical and the horizontal deflection takes place at the triple rate as compared with the scanning rate occurring in the conventional system.

Referring to FIG. 26, the deflection control circuit 22 includes the horizontal deflection circuit 25 and the vertical deflection circuit 24, each of which operates to deliver the horizontal deflection pulse HP and the vertical deflection pulse VP, respectively, which are "saw-tooth" pulses acting to deflect the electron beam in the CRT 21, on the basis of the triple rate horizontal sync signal 3HD and the triple rate vertical sync signal 3VD. In response to the vertical correction pulse SS delivered from the vertical deflection shift circuit 23, the vertical deflection circuit 24 shifts the vertical deflection pulse VP up and down. Subsequently, light from the monochromatic picture displayed on the CRT 21 is passed through the coloring device 5 having the rotary color filter 28. It is to be understood that the rotary color filter 28 may be replaced by liquid crystal shutter or the like.

A signal which is displayed on the CRT usually includes an interlaced signal such as an NTSC signal, and non-interlaced signal such as a signal from a personal computer. As shown in FIG. 28, the interlaced signal forms one picture frame with two fields. Since the number of horizontal sync signals contained in the vertical sync period includes a fraction equal to 0.5, two picture frames which are vertically displaced are sequentially displayed, thus deceiving a viewer and enhancing the vertical resolution. In the prior art system mentioned above, such an interlaced signal is converted into a field sequential signal RGB for display. At this end, the deflection control circuit 22 delivers the vertical deflection pulse VP and the horizontal deflection pulse HP on the basis of the vertical control signal VS (3VD) and the horizontal control signal HS (3HD). Since each of the vertical and horizontal deflection pulses VP and HP has a triple period as compared with the sync signals HD and VD, a picture of each color is interlace scanned every one-third field.

However, as illustrated in FIG. 30, there occurs a problem that the position of the scanning lines is shifted vertically without a vertical correction or in the absence of the vertical correction pulse SS. Specifically, without the vertical correction or in the absence of the vertical correction pulse SS, the vertical deflection pulses will be in the form of triangular waveforms having an equal spacing as illustrated in FIG. 31, but the field sequential signal will be lagging or leading (refer "G" in the field sequential signal shown in FIG. 31), whereby the position of scanning lines in the picture being displayed is displaced vertically. When employing the monochromatic picture based on the field sequential signal RGB, the color synthesis in the eye cannot be properly achieved unless different primary color signals are displayed on the same position on the display screen. Otherwise there results a picture containing color breakup and having a degraded vertical resolution.

To overcome such problem, there has been a proposal to utilize a vertical correction pulse SS, which is added as an offset voltage (or current) to the vertical deflection pulse to displace the position of the scanning lines up or down, so that if the same field is delivered in succession, a mismatch between the position of the scanning lines during the individual fields can be prevented, as shown in FIG. 32 and FIG. 33. In this instance, the vertical deflection pulse is shifted either up or down as shown in FIG. 33, whereby the scanning line assumes the same position during the individual fields, permitting a display in which a degradation in the vertical resolution is minimized.

However, when this approach is employed, there is a need to provide a shift signal generator circuit for generating a vertical correction pulse in order to prevent a color breakup or to increase the vertical resolution when displaying an interlace scanning picture signal, presenting a problem that the resulting arrangement becomes expensive.

When the vertical deflection takes place under the influence of an electric field, and the deflection control circuit 22 is capacitively coupled to the monochrome CRT 21 through a capacitor as shown in FIG. 34, the vertical deflection pulse VP will be averaged. Accordingly, if the vertical correction pulse SS is applied, there remains a mismatch of positions of scanning lines in the interlace scanning display. Considering the reason here for, it will be noted that the vertical deflection circuit 24 is constructed in a manner as shown in FIG. 35, and delivers a triangular waveform by closing a switch 33 in response to a vertical control signal VS to charge a capacitor 34 from a constant current source 31 during a scan interval while the charge stored is discharged from the capacitor 34 during a blanking period. At this time, the waveform of the vertical deflection pulse VP is averaged as illustrated in FIG. 36. Accordingly, the position of the scanning line can not be properly corrected for each field, but a picture of each field is displaced while being slightly offset from each other.

In the prior art system as mentioned above, a picture is displayed on the basis of the field sequential signal at a triple rate, as compared with the usual arrangement. Accordingly, the spacing of the horizontal and the vertical sync signal will be one-third the usual value. This means that a blanking interval which is provided for the flyback of the electron beam is reduced, and as a consequence, the flyback cannot be achieved in a satisfactory manner, and the flyback operation extends into active display interval, presenting a problem that light from the flyback portion appears on the display screen. To eliminate such problem, it has been necessary to narrow the effective screen size which can be used for the display.

In addition, when the rotary color filter 28 is used to color the picture being displayed, each color filter section is capable of transmitting on the order of only 20% of the white light which is emitted from the monochrome CRT 21, presenting a problem of insufficient luminance.

SUMMARY OF THE INVENTION

It is an object of the present invention to provide a system and a method for displaying a color picture which is capable of avoiding a color breakup and improving a vertical resolution while suppressing an increase in the cost.

According to the present invention, a system for displaying a color picture, has: a field sequential signal generator for receiving and storing a color picture signal, which includes a plurality of signal components per field, at a first rate and sequentially sending the plurality of signal components, as a field sequential signal, at a second rate which is higher than the first rate; a picture display for displaying a monochromatic picture based on each of the signal components sent from the field sequential signal generator at the second rate; a coloring device for coloring light emitted from the monochromatic picture displayed on the picture display; and a controller for sending a vertical sync signal, which includes a plurality of vertical sync pulses corresponding to the signal components respectively, to the picture display. The controller controls a timing at which each of the vertical sync pulses is sent to the picture display in such a way that respective time intervals between when the vertical sync pulse is sent from the controller to the picture display and when the signal component is sent from the field sequential signal generator to the picture display are equal.

According to the present invention, a method for displaying a color picture, comprising the steps of: (a) receiving and storing a color picture signal, which includes a plurality of signal components per field, in a field sequential signal generator at a first rate; (b) sending a vertical sync signal, which includes a plurality of vertical sync pulses corresponding to the signal components respectively, from a controller to a picture display; (c) sequentially sending the signal components, as a field sequential signal, from the field sequential signal generator to the picture display at a second rate which is higher than the first rate, thereby displaying a monochromatic picture based on each of the signal components on the picture display; and (d) coloring light emitted from the monochromatic picture displayed on the picture display. The controller controls a timing at which each of the vertical sync pulses is sent to the picture display in such a way that respective time intervals between when the vertical sync pulse is sent from the controller to the picture display and when the signal component is sent from the field sequential signal generator to the picture display are equal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

First Embodiment

Figure 1:
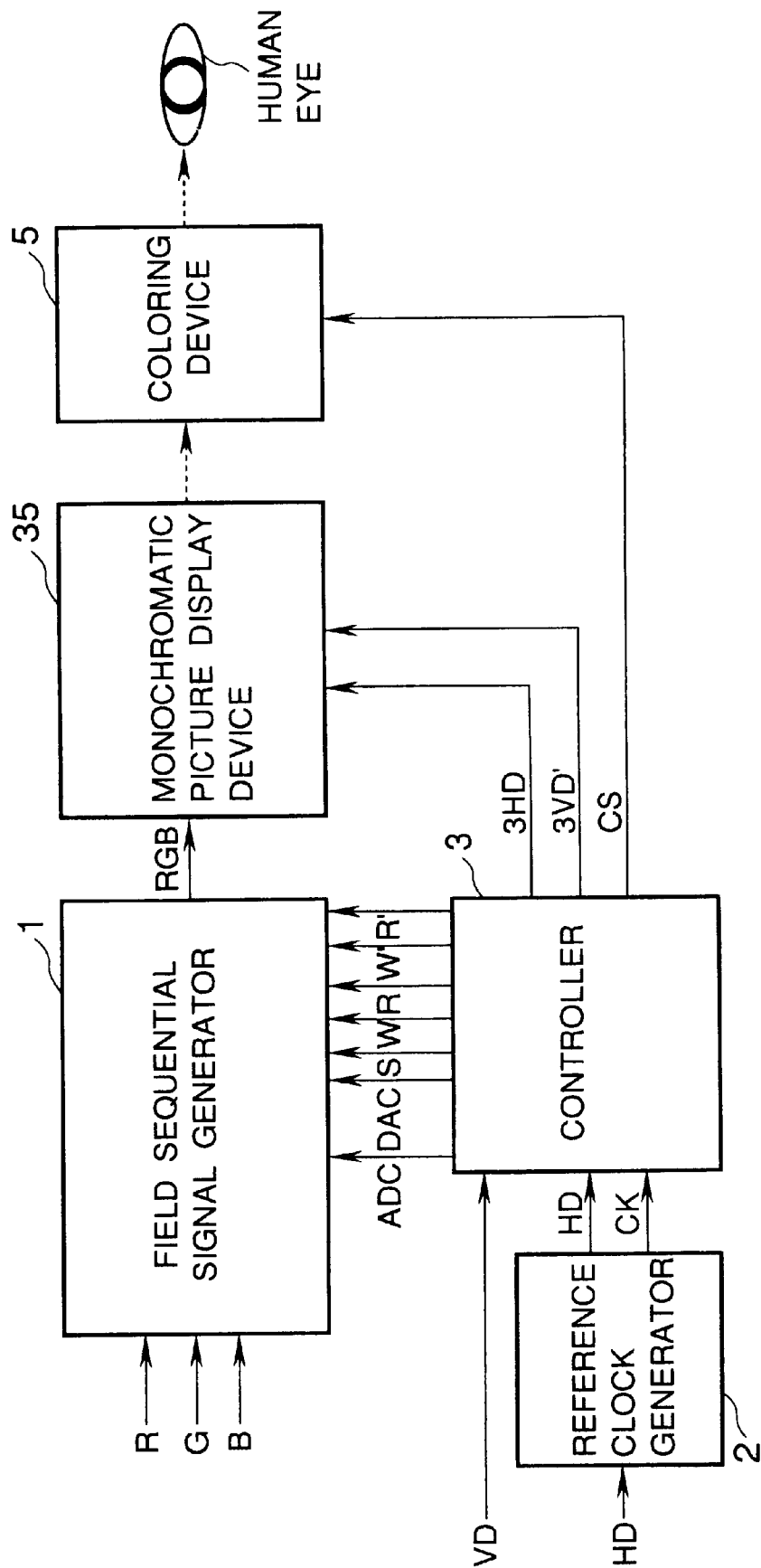
FIG. 1 is a block diagram schematically showing a construction of a system for displaying a color picture according to a first embodiment of the present invention.

FIG. 1 is a block diagram schematically showing a construction of a system for displaying a color picture according to a first embodiment of the present invention.

Referring to FIG. 1, the system for displaying a color picture according to the first embodiment has a field sequential generator circuit 1 which receives and stores a color picture signal including primary color signals R, G and B and sequentially sends a field sequential signal RGB, a reference clock generator 2 which produces a reference clock CK, a monochromatic picture display device 35 which displays a monochromatic picture on the basis of the field sequential signal RGB sent from the field sequential signal generator 1, a coloring device 5 which colors light emitted from the monochromatic picture displayed on a display screen of the monochromatic picture display device 35, and a controller 3 which controls the operation of the whole system.

Figure 23:
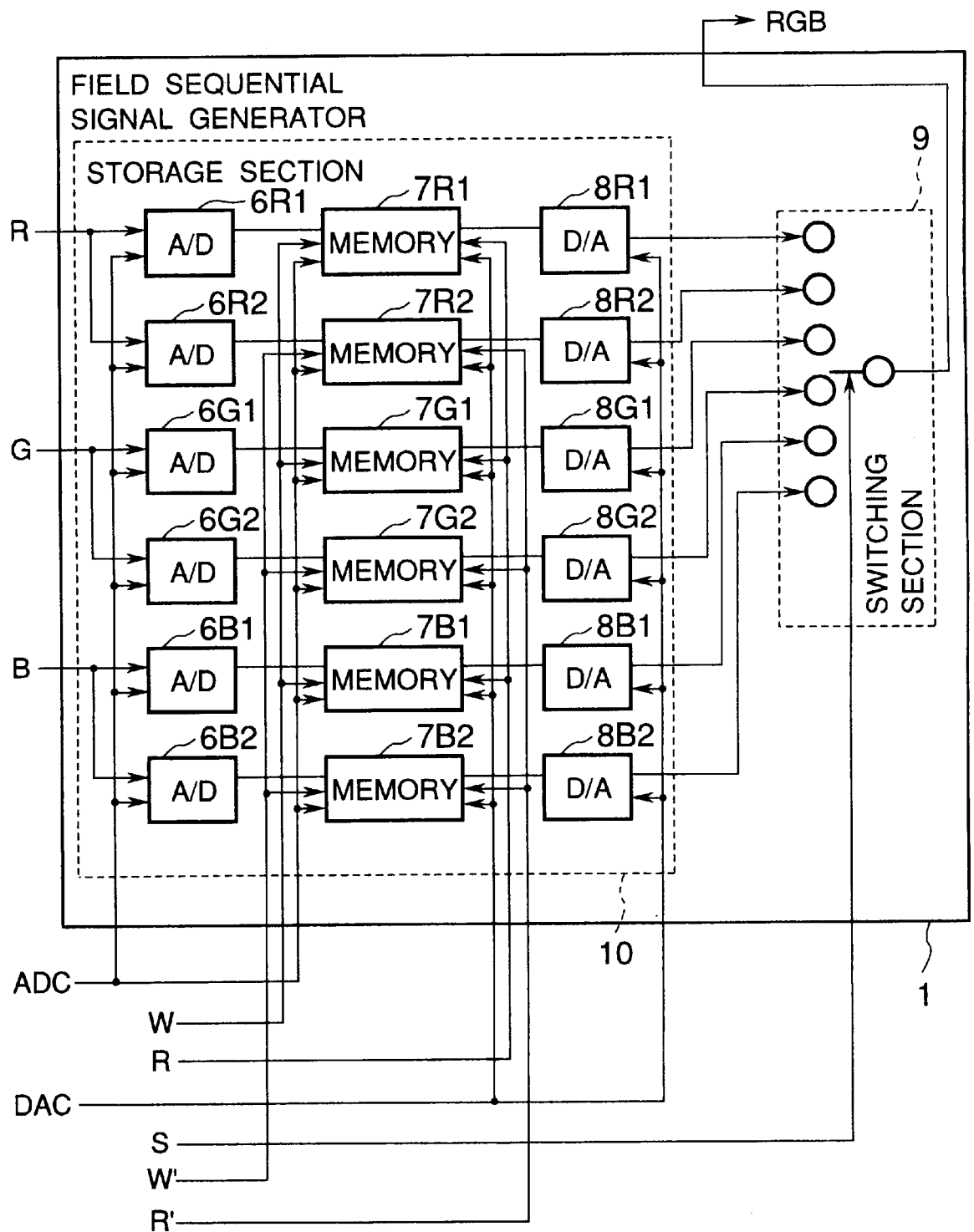
FIG. 23 is a block diagram schematically showing a construction of the field sequential signal generator 1 of FIG. 22.

The field sequential signal generator 1 is constructed in the same manner as that shown in FIG. 23. The field sequential signal generator 1 receives and stores the color picture signal, which includes a plurality of signal components R (red), G (green) and B (blue) per field, at a first rate. The field sequential signal generator 1 then converts the color picture signal into the field sequential signal RGB and sequentially sending the plurality of signal components, as the field sequential signal RGB, at a second rate which is triple the first rate.

It should be understood that while the description given here in connection with FIG. 1 assumes that the siganl components are three primary colors, namely, red, green and blue, a combination of other colors such as cyan, yellow and magenta may also be used.

In addition, the number of inputted primary color signals is not limited to three.

Further, in FIG. 1, the field sequential signal RGB is sent at the second rate which is the triple rate as compared with the first rate with which the primary color signals R, G and B are inputted. However, the present invention is not limited to this rate. Nevertheless, it should be noted that when a rate less than the triple rate is chosen for a usual television signal, a flicker occurs, while when a rate greater than the triple rate is used, an increased capacity of memory is required for the field sequential signal generator 1, causing an increase of cost, and thus the use of such a greater rate is not practical.

Furthermore, it should be noted that while the field sequential signal RGB is delivered by repeating the primary color signals in the sequence of R, G and B, the present invention is not limited thereto. The sequence of primary color signals may be in a different sequence such as G, R and B.

Figure 2:
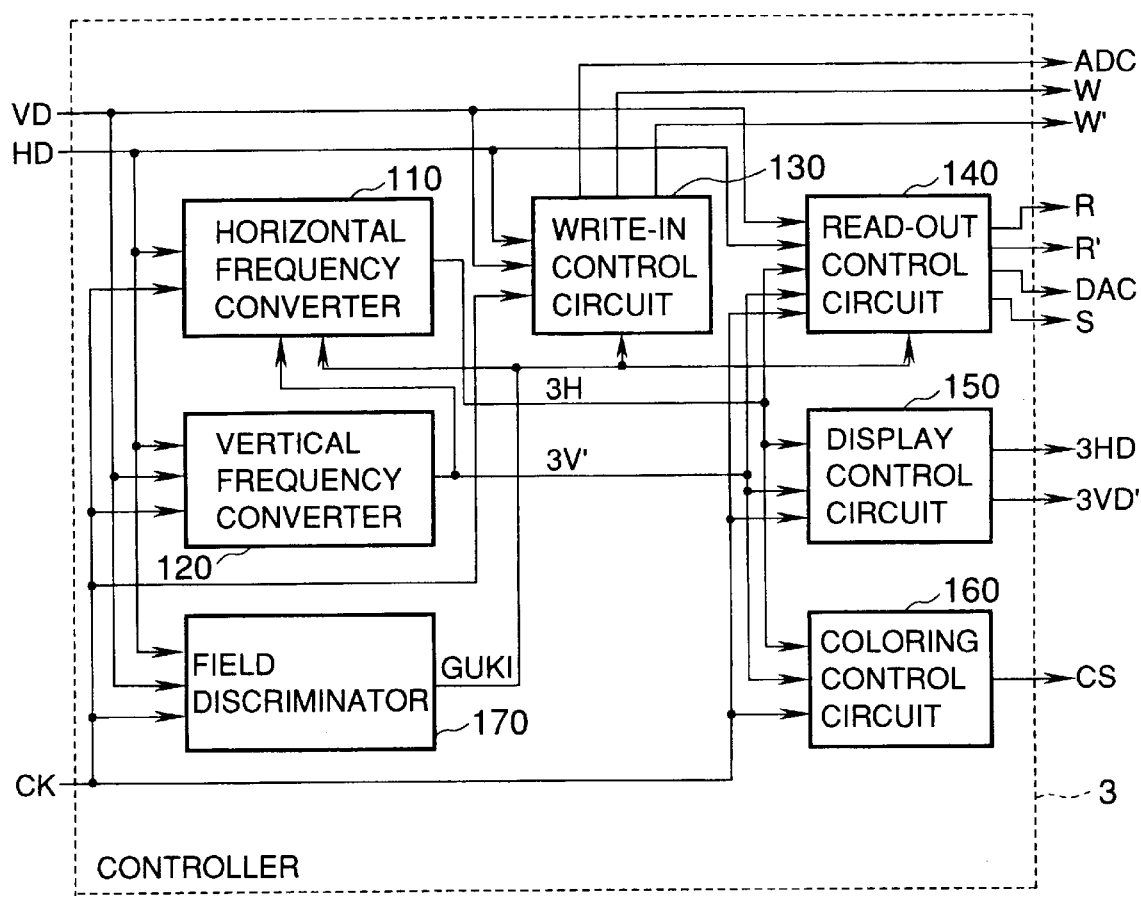
FIG. 2 is a block diagram showing a construction of the controller 3 shown in FIG. 1.

FIG. 2 is a block diagram showing a construction of the controller 3 shown in FIG. 1.

Referring to FIG. 2, the controller 3 has a horizontal frequency converter 110 which simply converts a horizontal sync signal HD into a triple rate horizontal sync signal 3H, a vertical frequency converter 120, a field discriminator 170 which discriminates a field into which a picture signal is written into, a write-in control circuit 130 which controls a data write-in operation into the memories 7R1, 7R2, 7B1, 7B2, 7G1 and 7G2 (shown in FIG. 17) in the storage section 10 (shown in FIG. 17) of the field sequential signal generator 1, a read-out control circuit 140 which controls a data read-out operation from the memories 7R1, 7R2, 7B1, 7B2, 7G1 and 7G2 (shown in FIG. 17) in the storage section 10 (shown in FIG. 17) of the field sequential signal generator 1, a display control circuit 150 which controls the monochromatic picture display device 35, and a coloring control circuit 160 which controls the coloring device 5.

Figure 3:
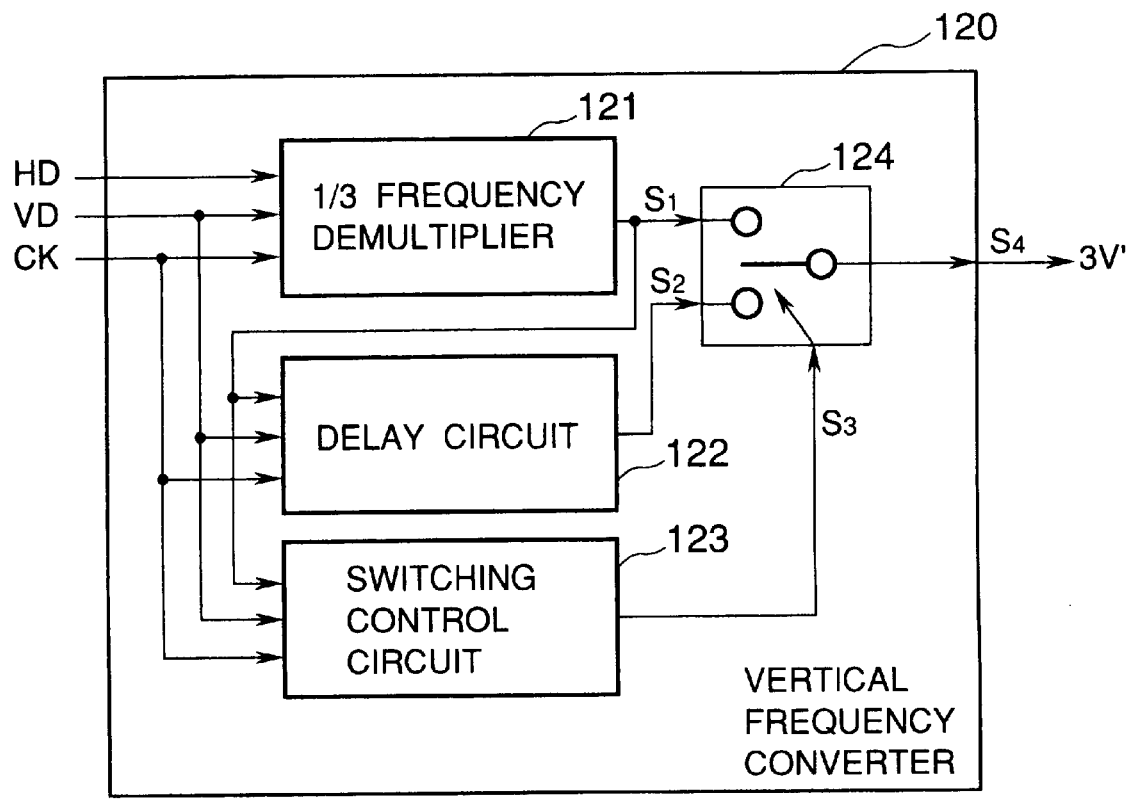
FIG. 3 is a block diagram schematically showing a construction of the vertical frequency converter 120 shown in FIG. 2.
Figure 4:
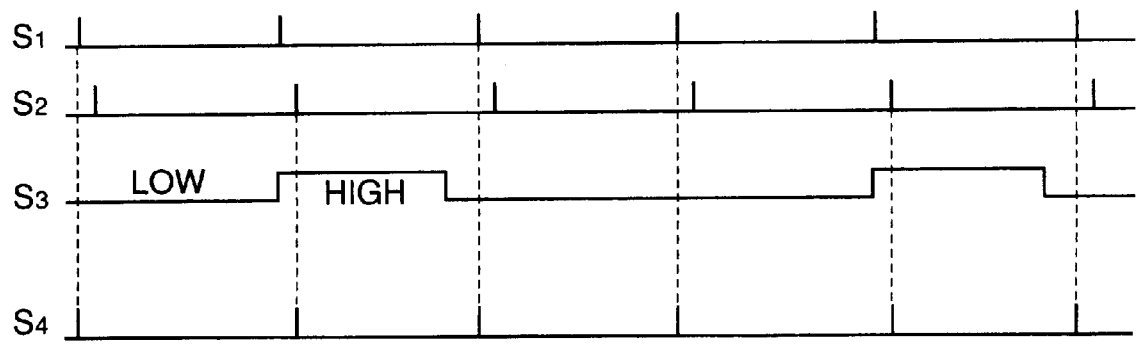
FIG. 4 is a timing chart for explaining an operation of the vertical frequency converter 120.

FIG. 3 is a block diagram schematically showing a construction of the vertical frequency converter 120 shown in FIG. 2, and FIG. 4 is a timing chart for explaining an operation of the vertical frequency converter 120.

Referring to FIG. 3, the vertical frequency converter 120 has a ⅓ frequency demultiplier 121 which converts an inputted signal into a signal having one-third period (i.e., a triple rate signal), a delay circuit 122 which delays an inputted signal by a given time interval. The vertical frequency converter 120 also has a change-over switch 124 and a switching control circuit 123 which controls the operation of the change-over switch 124. The switching control circuit 123 send the control signal $S_3$ to the change-over switch 124. The change-over switch 124 selects the triple rate signal $S_1$ which is delivered from the frequency demultiplier 121 when the control signal $S_3S_3$ is at a low level, and selects the delayed triple rate signal $S_2$ which is delivered from the delayed circuit 122 when the control signal $S_3$ is at high level, thereby outputting the signal $S_4$.

Figure 5:
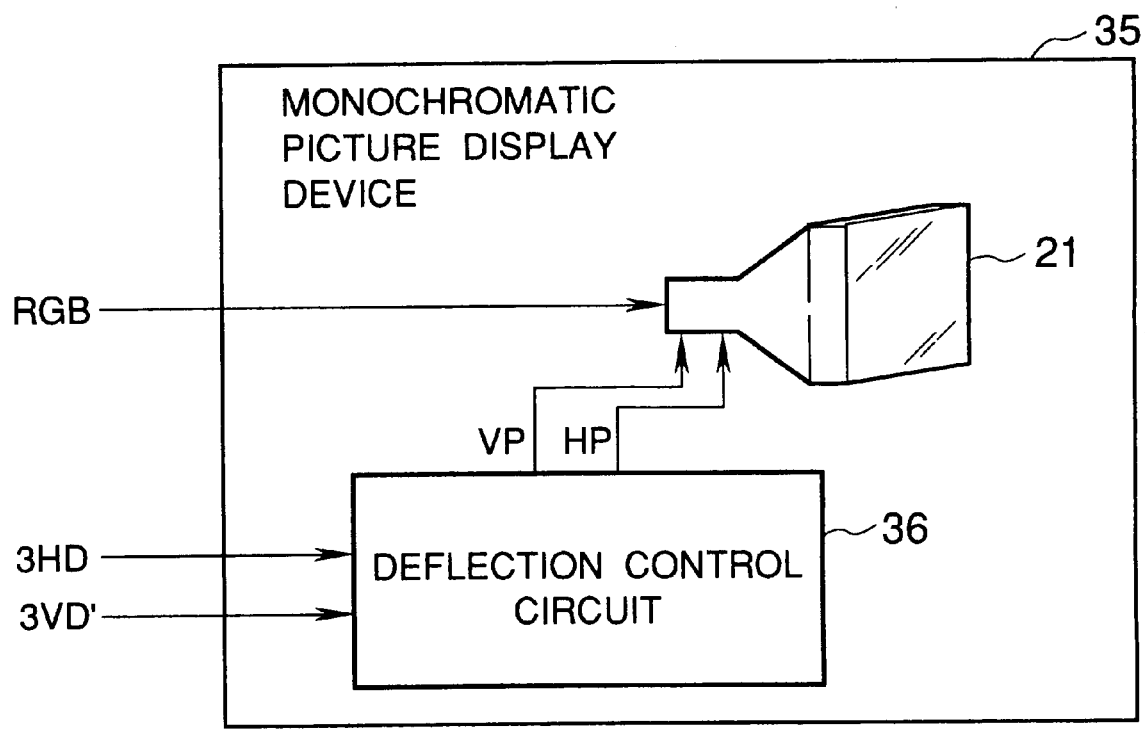
FIG. 5 is a block diagram showing the monochromatic picture display device 35 shown in FIG. 1.

FIG. 5 is a block diagram showing the monochromatic picture display device 35 shown in FIG. 1.

Referring to FIG. 5, the monochromatic picture display device 35 has a monochrome CRT 21, and a deflection control circuit 36 which supplies a horizontal deflection pulse HP and a vertical deflection pulse VP to deflection yokes (not shown in the figures) of the monochrome CRT 21. As shown in FIG. 5, the deflection control circuit 36 is directly connected to the monochrome CRT 21 without using a capacitive coupling through a capacitor.

Figure 6:
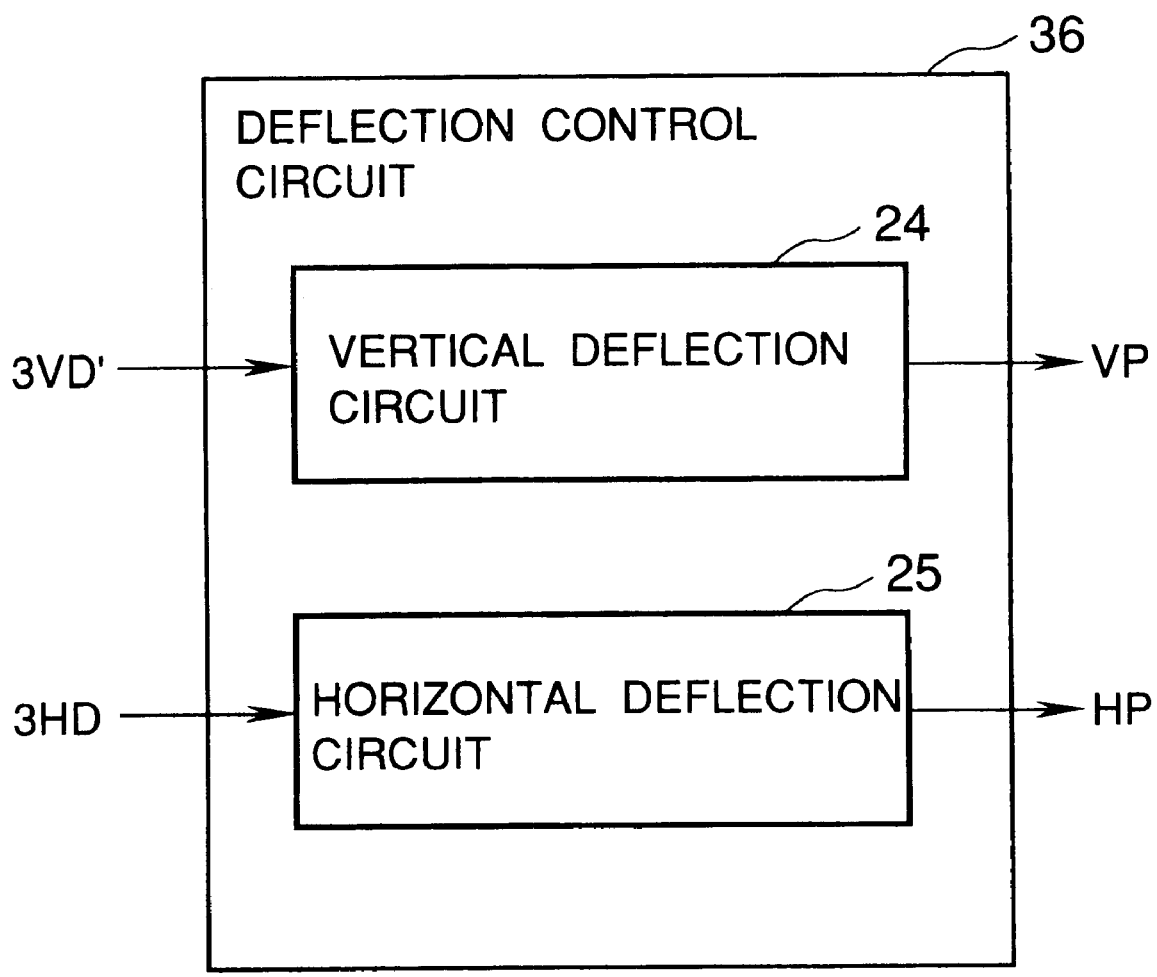
FIG. 6 is a block diagram schematically showing a construction of the deflection control circuit 36 shown in FIG. 5.

FIG. 6 is a block diagram schematically showing a construction of the deflection control circuit 36 shown in FIG. 5.

Referring to FIG. 6, the deflection control circuit 36 has a vertical deflection circuit 24 which outputs the vertical deflection pulse VP on the basis of a triple rate vertical deflection signal 3VD', and a horizontal deflection circuit 25 which outputs the horizontal deflection pulse HP on the basis of a triple rate horizontal deflection signal 3HD.

Figure 7:
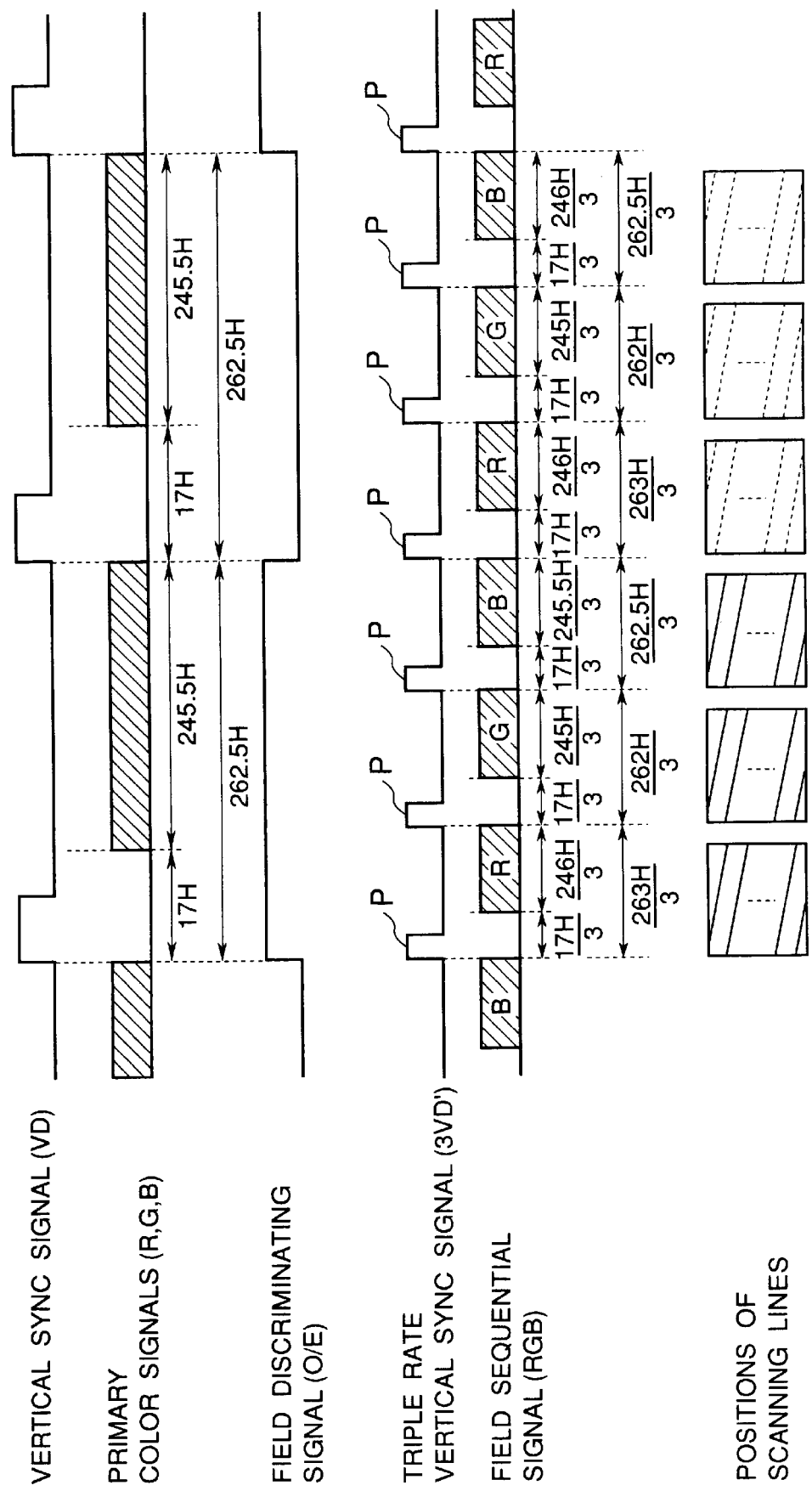
FIG. 7 is an explanatory diagram showing a relationship between the triple rate vertical sync signal 3VD' and the field sequential signal RGB in the system for displaying a color picture according to the first embodiment, and the position of the scanning lines on the monochromatic CRT 21.

FIG. 7 is an explanatory diagram showing a relationship between the triple rate vertical sync signal 3VD' and the field sequential signal RGB in the system for displaying a color picture according to the first embodiment, and the position of the scanning lines on the monochromatic CRT 21.

Figure 8:
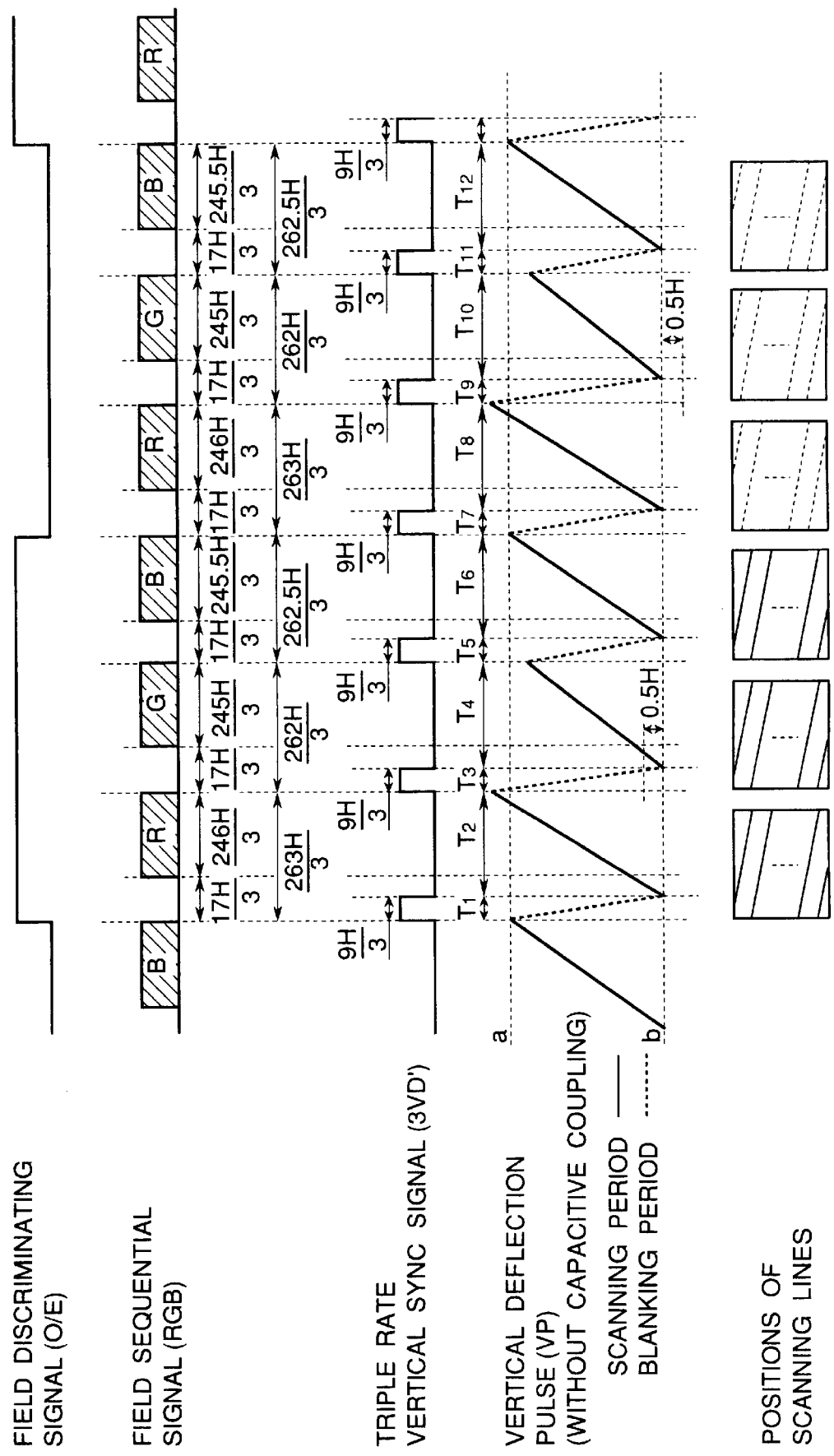
FIG. 8 is an explanatory diagram showing a relationship between the vertical deflection pulse VP and the position of the scanning lines on the monochromatic CRT 21.

FIG. 8 is an explanatory diagram showing a relationship between the vertical deflection pulse VP and the position of the scanning lines on the monochromatic CRT 21.

Next, the operation of system for displaying a color picture according to the first embodiment will be described with respect to FIG. 1 to FIG. 8.

Figure 24:
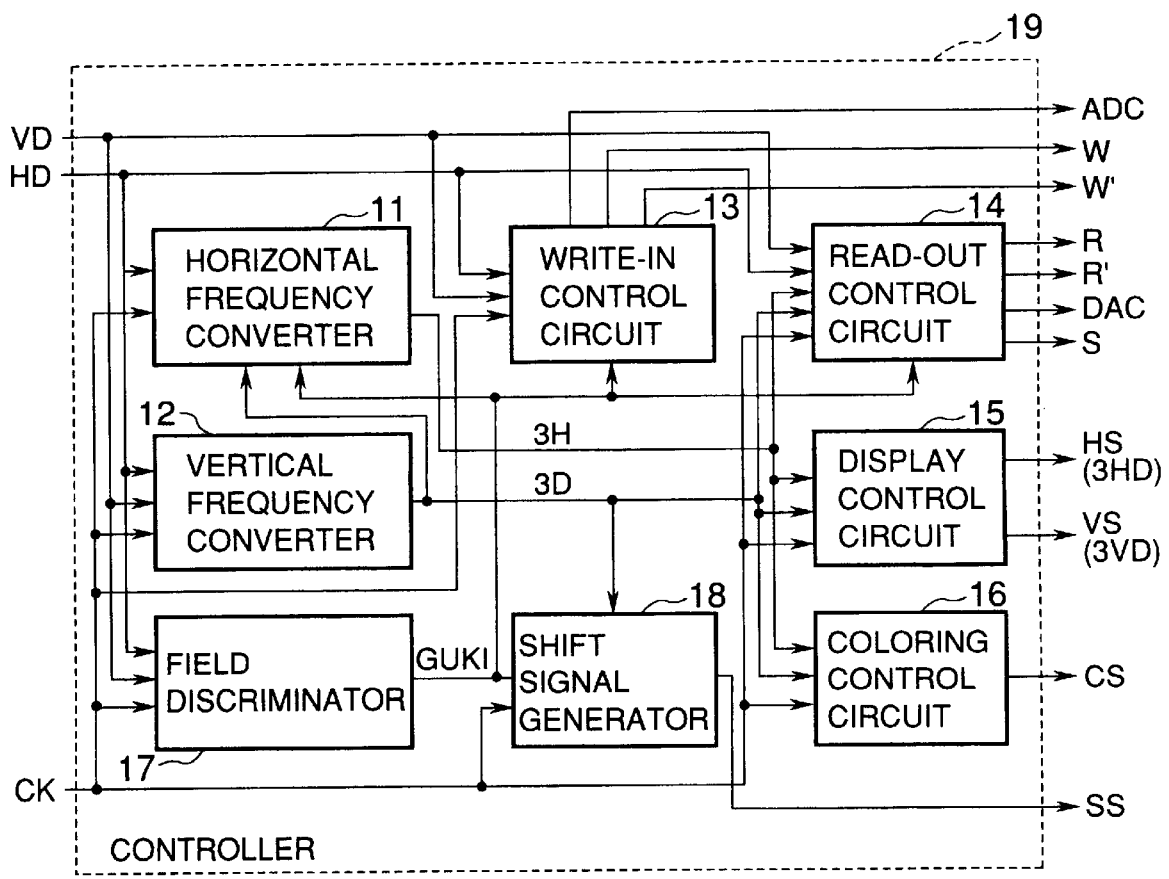
FIG. 24 is a block diagram schematically showing a construction of the controller 19 shown in FIG. 22.
Figure 25:
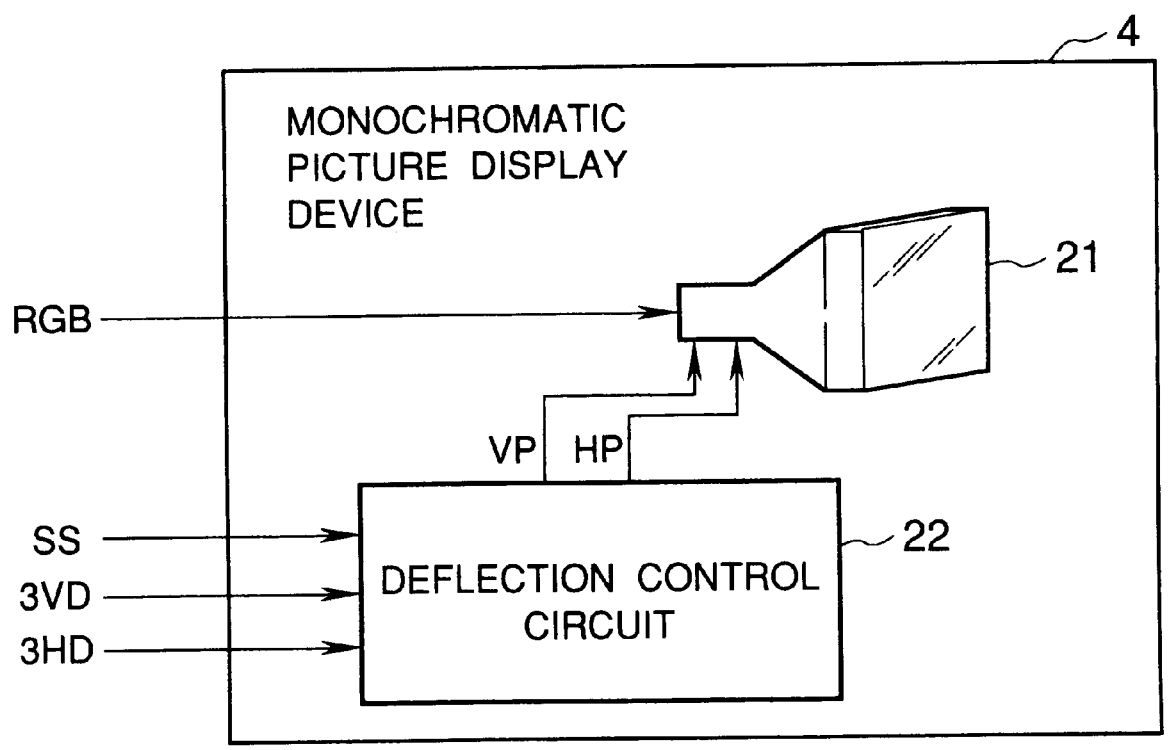
FIG. 25 shows the monochromatic picture display device 4 shown in FIG. 22.

Referring to FIG. 1, the three primary color signals R, G and B as signal components of the inputted color picture signal are converted into the field sequential signal RGB in the field sequential signal generator 1. Referring to FIG. 2, the field discriminator 170 of the controller 3 discriminates a field into which the picture signal is written into, and the write-in control circuit 130 and the read-out control circuit 140 operate in a manner such that the primary color signals in the same field are delivered in succession, namely, R (odd field), G (odd field), B (odd field), R (even field), G (even field) and B (even field) are sequentially delivered in succession. The field sequential signal generator 1 outputs the primary color signals as a field sequential signal RGB in synchronism with the triple rate vertical sync signal 3VD' when displaying the odd field, and in synchronism with the triple rate vertical sync signal 3VD' as shifted by one-half the period of the triple rate horizontal sync signal 3HD (i.e., H/3) when displaying the even field. This eliminates the need for the provision of the prior art shift signal generator circuit 18 shown in FIG. 24.

In other words, the controller 3 delivers the triple rate horizontal sync signal 3HD in succession, and delivers the triple rate vertical sync signal 3VD' so that the position of the scanning lines remains unchanged for the field sequential signal RGB. Specifically, the controller 3 controls a timing at which each of the vertical sync pulses P of the triple rate vertical sync signal 3VD' is sent to the monochromatic picture display device 35 in such a way that respective time intervals between when the vertical sync pulse P is sent from the controller 3 to the monochromatic picture display device 35 and when the signal component R, G or B is sent from the field sequential signal generator 1 to the monochromatic picture display device 35 are equal for each of the field sequential signal RGB. As shown in FIG. 7, the respective time intervals between the rising edge of the vertical sync pulse P and the signal component R, G or B are 17 H/3.

To realize the above-mentioned operation, rather than converting the vertical sync signal VD simply into the triple rate vertical sync signal 3VD (corresponding to the signal $S_1$ in FIG. 4) in the vertical frequency converter 120, the vertical frequency converter 120 delivers a triple rate vertical sync signal 3VD' (corresponding to the signal $S_4$ in FIG. 4) which is obtained by switching at a given point of time between a ⅓ frequency demultiplied signal $S_1$ and the delayed signal $S_2$ which is delayed for a given time interval.

That is to say, pulses in signal $S_1$ are produced with a period which is equal to one-third the vertical sync interval in the ⅓ frequency demultiplier 121, as shown in FIG. 4. The signal $S_1$ is delayed by 0.5 times the horizontal sync interval (H/2) in the delay circuit 122 to produce the signal $S_2$. A switching between the delayed signal $S_2$ and the signal $S_1$ delivered from the frequency demultiplier 121 takes place by the change-over switch 124 which is controlled by the switch control circuit 123, thus producing the signal $S_4$ which has a varying spacing between the occurrences of adjacent vertical sync pulses.

Further, the controller 3 controls the timing at which each of the vertical sync pulses P is sent to the monochromatic picture display device 35 in such a way that a phase difference equal to one-sixth a horizontal sync signal interval H is provided between the vertical sync pulses P during an even field and the vertical sync pulses P during an odd field, thereby causing the monochromatic picture display device 35, thereby performing an interlace scanning.

Figure 26:
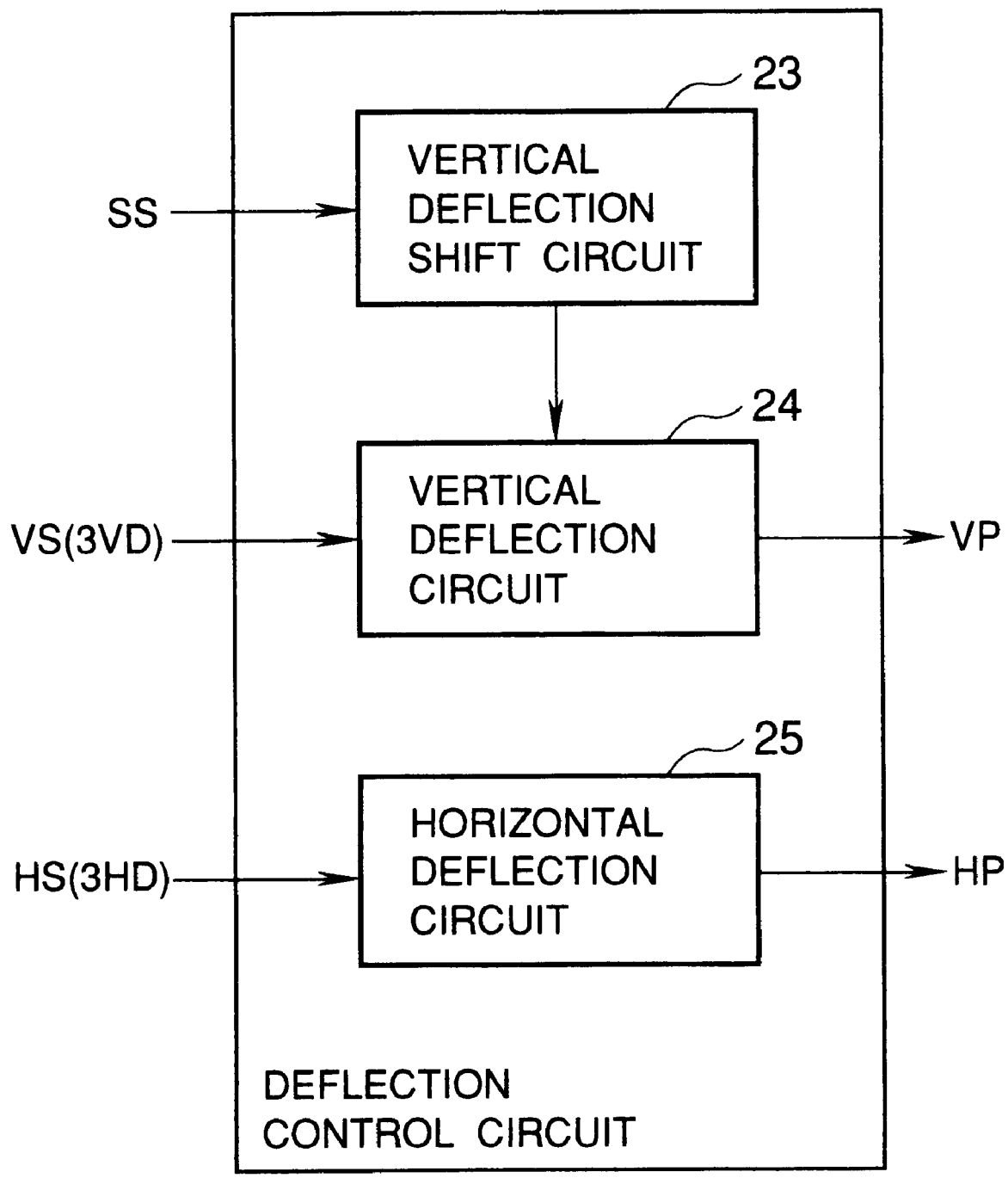
FIG. 26 is a block diagram schematically showing the deflection control circuit 22 shown in FIG. 25 in detail.

In the first embodiment, no use is made of the vertical correction pulse SS as used in the prior art system shown in FIG. 26, and hence the deflection control circuit 36 can be constructed with only the vertical deflection circuit 24 and the horizontal deflection circuit 25, as shown in FIG. 6.

Then, it will be noted from FIG. 7 that the interval between the triple rate vertical sync signals 3VD', which are successively delivered, varies. For example, the interval corresponds to 263 H/3 for R signal, 262 H/3 for G signal and 262.5 H/3 for B signal, as shown in FIG. 7.

The vertical deflection circuit 24 in the deflection control circuit 36 for the monochromatic picture display device 35 produces and delivers the vertical deflection pulse VP on the basis of the triple rate vertical sync signal 3VD'. In the first embodiment, the intervals between the triple rate vertical sync signals 3VD' are not constant, as shown in FIG. 7. But, it is possible to scan the same position if the time interval between the triple rate vertical sync signal 3VD' and the field sequential signal RGB remains constant. In other words, the position of the scanning lines which are used for display varies in accordance with the phase difference between the vertical sync signal 3VD' and the horizontal sync signal.

Thus, when a time interval from the delivery of the triple rate vertical sync signal 3VD' (i.e., the rising edge of the corresponding pulse in FIG. 7) to the commencement of delivery of the field sequential signal RGB remains constant (which is chosen to be 17 H/3 in FIG. 7), the position of the scanning lines can be maintained constant by merely changing the phase difference. In other words, the interlace scanning is conducted by displacing the position of the scanning lines for G signal by one-half the interval (H/6) of the triple rate horizontal sync signal 3HD so that the interval from the delivery of the triple rate vertical sync signal 3VD' to the commencement of delivery of the field sequential signal RGB is maintained constant (which is chosen to be 17 H/3 in FIG. 7 in each field).

Thus, even though a total number of the scanning lines which are used for display varies from color to color, the positions of each scanning line for each color in the same field are the same, since the deflection pulse has the same phase angle. Thus, the phase angle of the deflection pulse assumed during each of intervals $T_2$, $T_4$, $T_6$, $T_8$, $T_{10}$ and $T_{12}$ shown in FIG. 8 remain the same. In this instance, scanning lines belonging to one field are displayed on the same position for the color picture signals. Thus, three scanning lines during an odd field which are indicated by solid lines in FIG. 8 assume the same location, as are three scanning lines during an even field, shown in broken lines. As a result of the described arrangement, the position of the scanning lines can be maintained constant despite any change in the deflection characteristic of the monochrome CRT 21.

As described above, with the system or the method for displaying a color picture according to the first embodiment, the achievement of the same position for the scanning lines during each field can be realized without any addition of complex circuitry, thus allowing a vertical resolution to be improved and a color breakup to be avoided while suppressing an increase in the cost.

Second Embodiment

Figure 32:
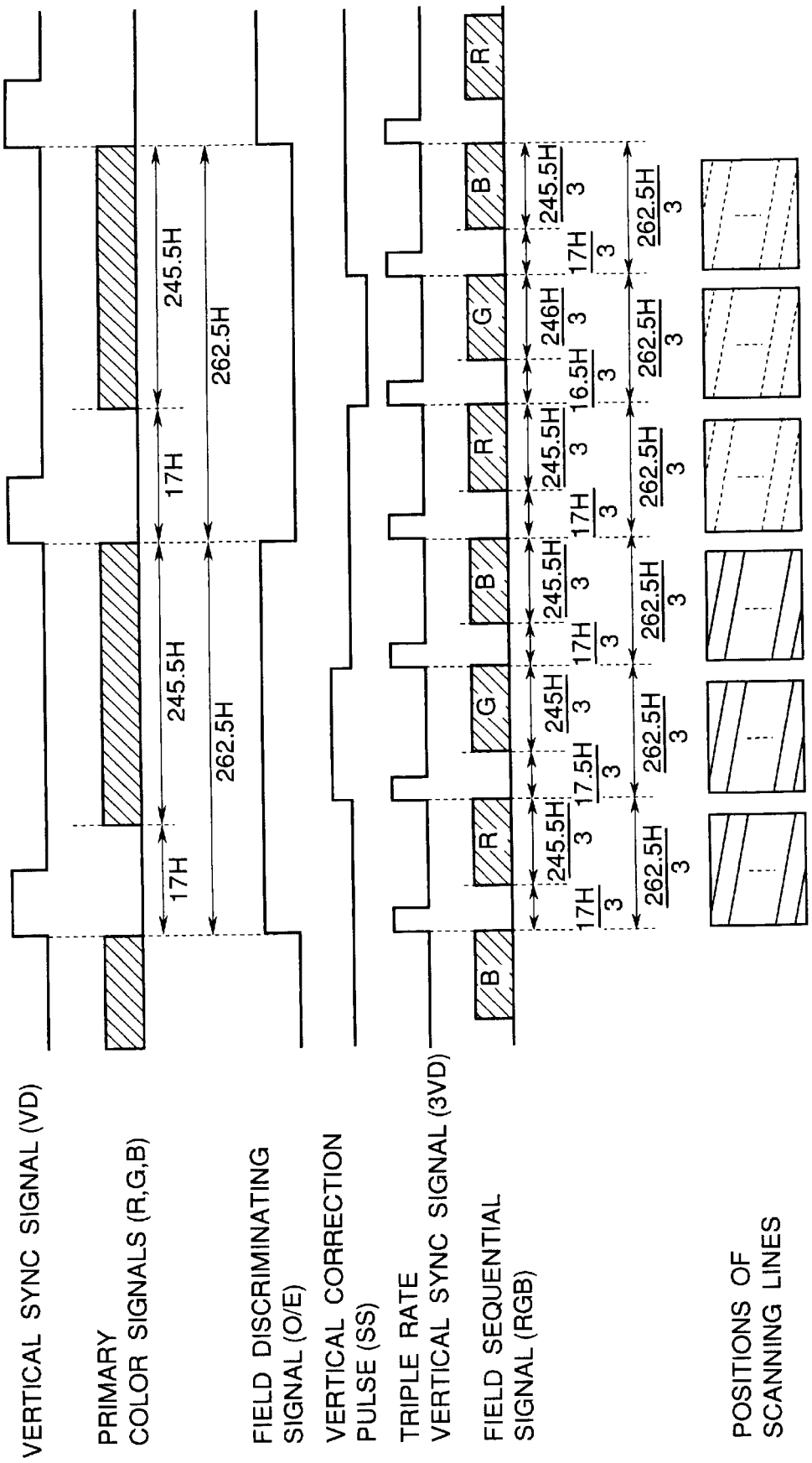
FIG. 32 is an explanatory diagram showing timings of various signals appearing in the prior art system and the position of the scanning lines on the monochromatic picture display device when the vertical correction pulse SS is inputted.
Figure 33:
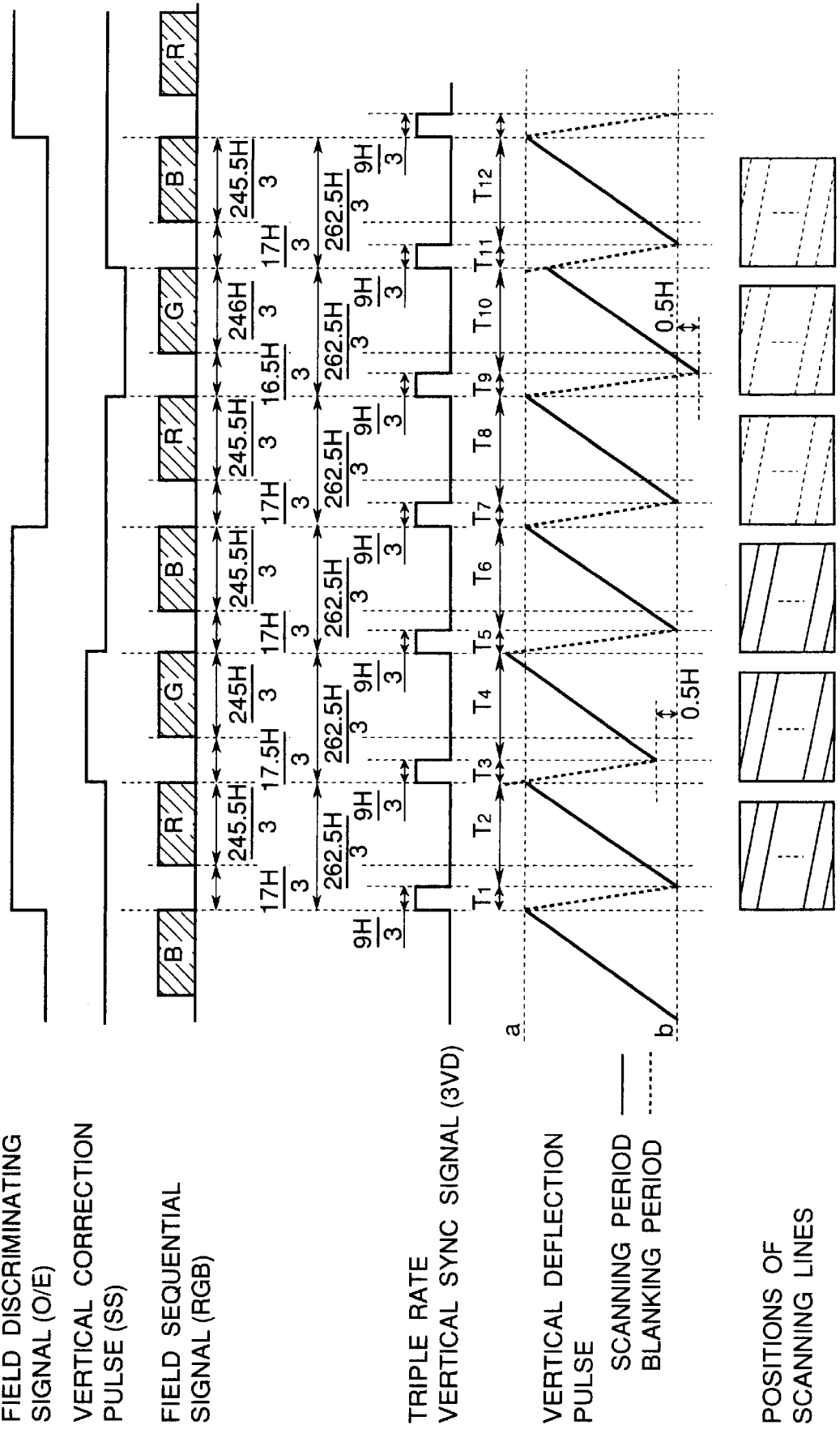
FIG. 33 is an explanatory diagram showing the vertical deflection pulses and the position of the scanning lines on the monochromatic picture display device when the vertical correction pulse SS is inputted.
Figure 34:
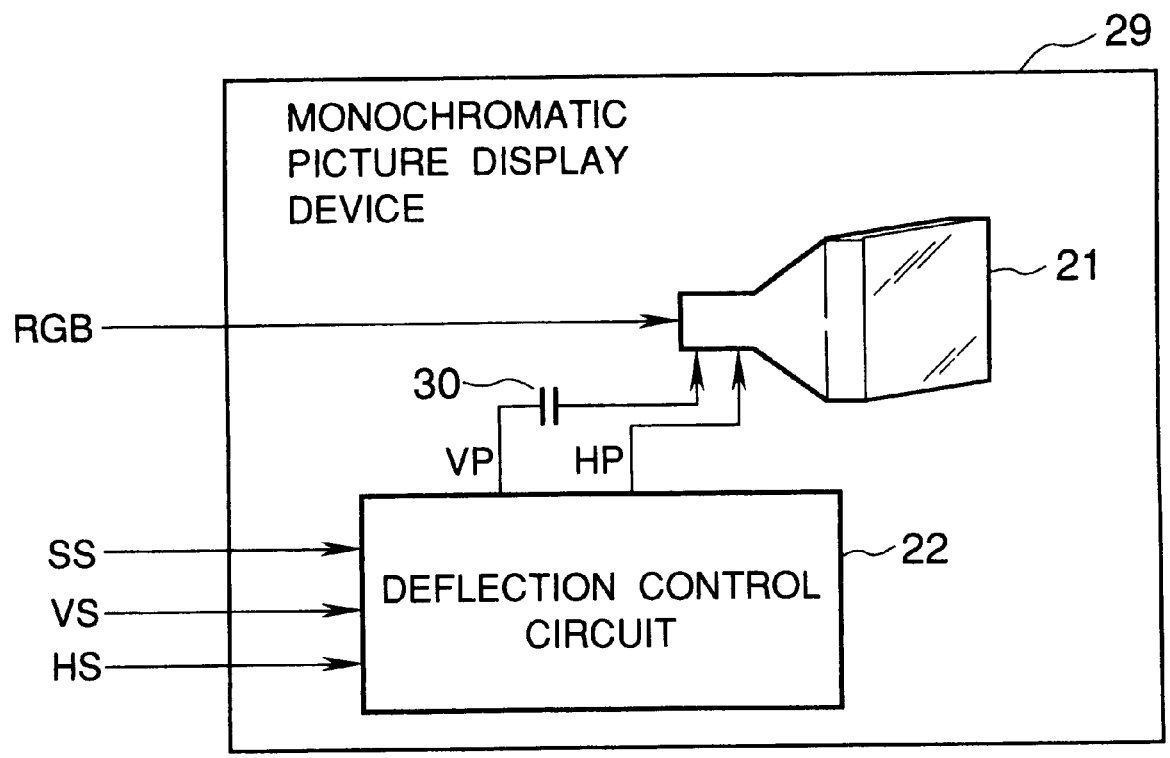
FIG. 34 is a block diagram schematically showing another monochromatic picture display device 29 used in the prior art.

As discussed previously in connection with FIG. 34, when the vertical deflection is conducted under the influence of an electric field and the deflection control circuit 22 is capacitively coupled to the monochrome CRT 21 through the capacitor, the vertical deflection pulse VP will be averaged. As a consequence, there remains a disadvantage that the position of the scanning lines during an interlace scanning is shifted even if the vertical correction pulse SS shown in FIG. 32 and FIG. 33 is used.

Figure 35:
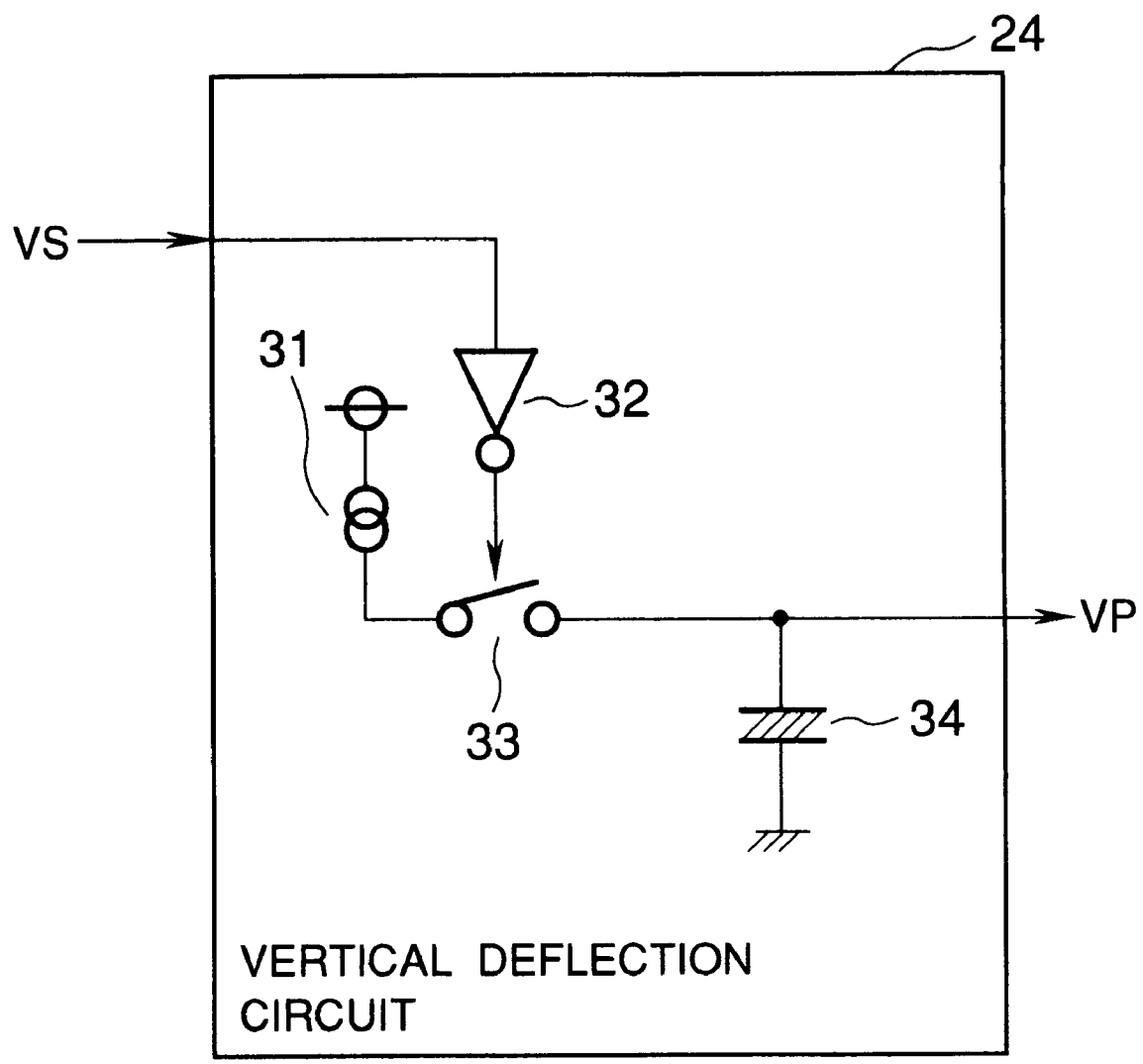
FIG. 35 is a circuit diagram of the vertical deflection circuit 24 shown in FIG. 34.
Figure 36:
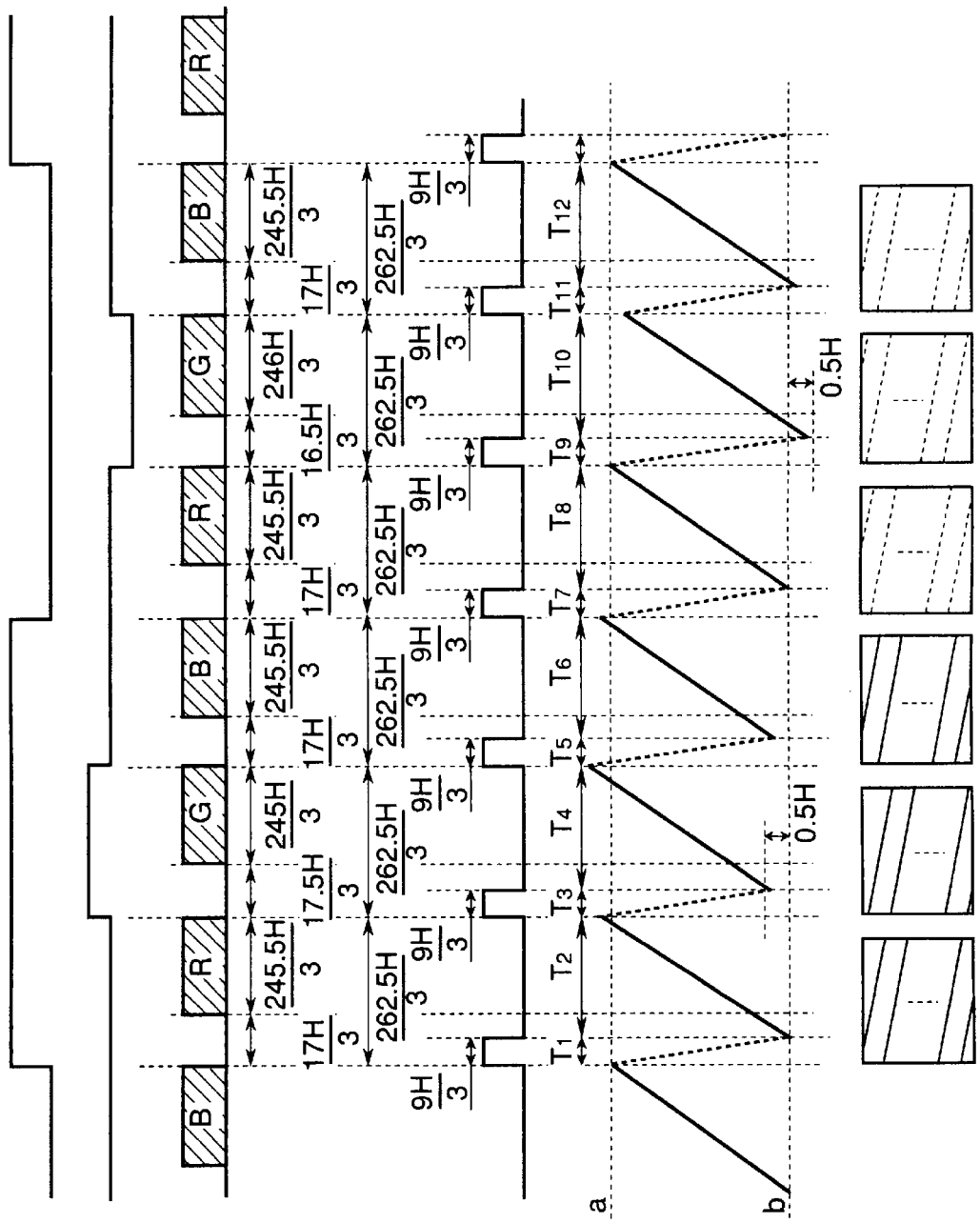
FIG. 36 is an explanatory diagram for explaining problems which occur when the monochromatic picture display device 29 shown in FIG. 34 is used.

A reason for this disadvantage will be described below. The vertical deflection circuit 24 is constructed in a manner shown in FIG. 35. During a scanning period, the switch 33 is closed in accordance with the vertical control signal VS, whereby the capacitor 34 is charged from the constant current source 31. During a blanking period (or flyback period), the stored charge is discharged from the capacitor 34, thus outputting the vertical deflection pulse VP having a triangular waveform. At this time, the waveform of the vertical deflection pulse VP is averaged as illustrated in FIG. 36. Accordingly, the picture will be displayed independently from the field, and thus the picture during each field tends to be displayed with an offset as compared with the picture displayed without the provision of the capacitor 34.

Figure 9:
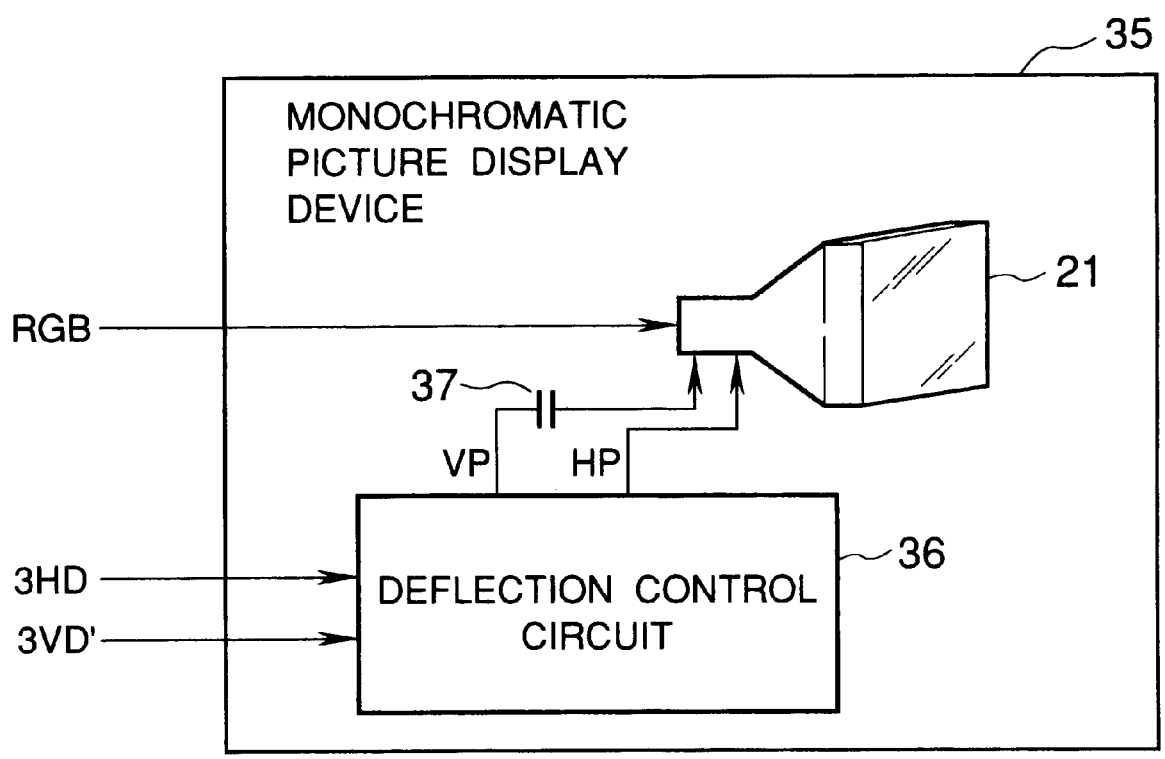
FIG. 9 is a block diagram showing a case where a deflection control circuit 36 is capacitively coupled to the monochrome CRT 21 thorough a capacitor 37 in the monochromatic picture display device 35 of the first embodiment.
Figure 10:
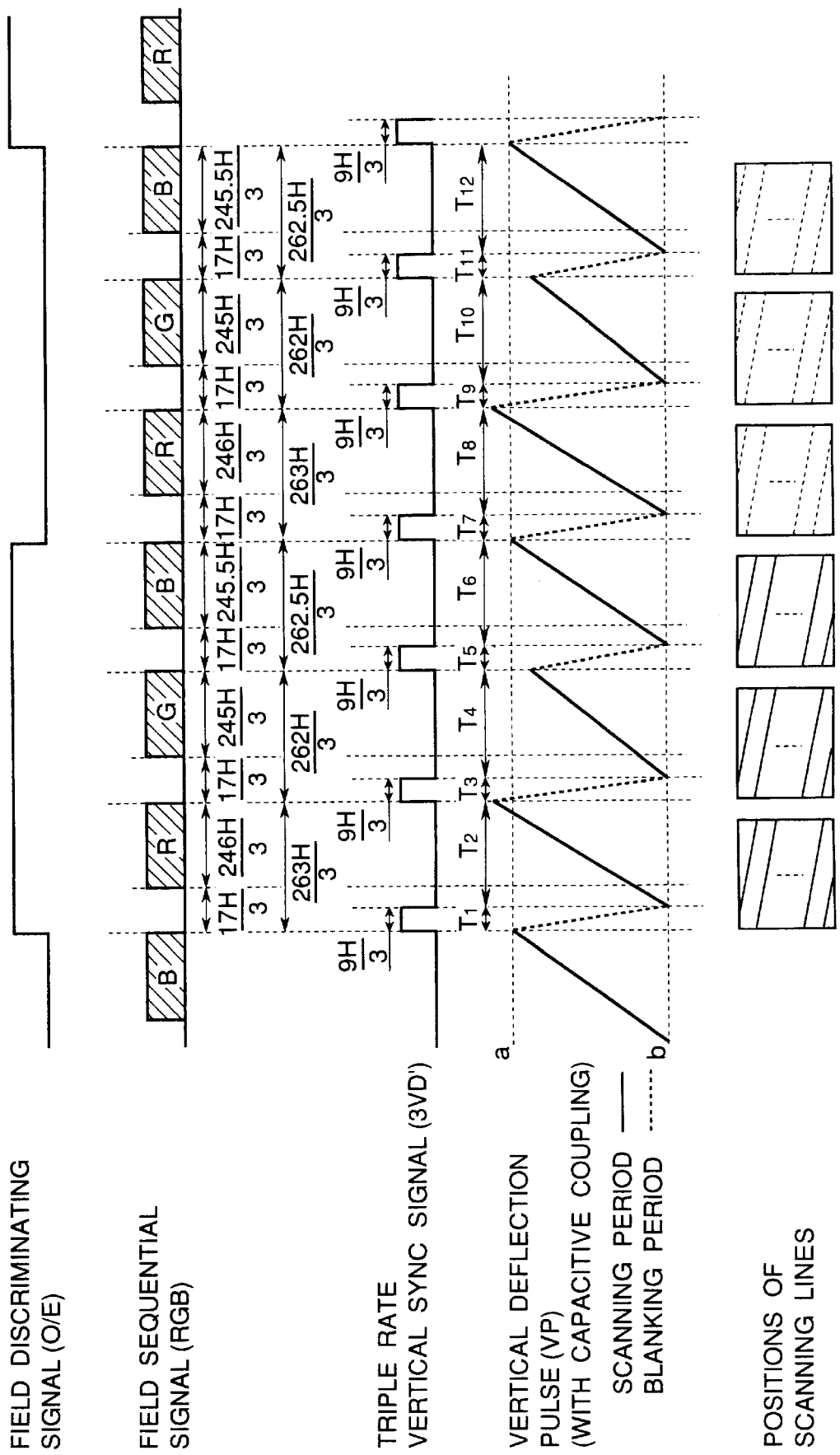
FIG. 10 is an explanatory diagram showing a problem which arises from the use of the monochromatic picture display device 35 of FIG. 9.

FIG. 9 is a block diagram showing a case where a deflection control circuit 36 is capacitively coupled to the monochrome CRT 21 thorough a capacitor 37 in the monochromatic picture display device 35 of the first embodiment. FIG. 10 is an explanatory diagram showing a problem which arises from the use of the monochromatic picture display device 35 of FIG. 9.

Referring to FIG. 10, when the deflection control circuit 36 is capacitively coupled to the monochrome CRT 21 through the capacitor 37 in the monochromatic picture display device 35 of the first embodiment, a picture during each field is displayed with a slight offset from the picture displayed without the provision of the capacitor 37.

In the second embodiment, the problem which arises when the deflection control circuit 36 is capacitively coupled to the monochrome CRT 21 through the capacitor 37 is solved.

Figure 11:
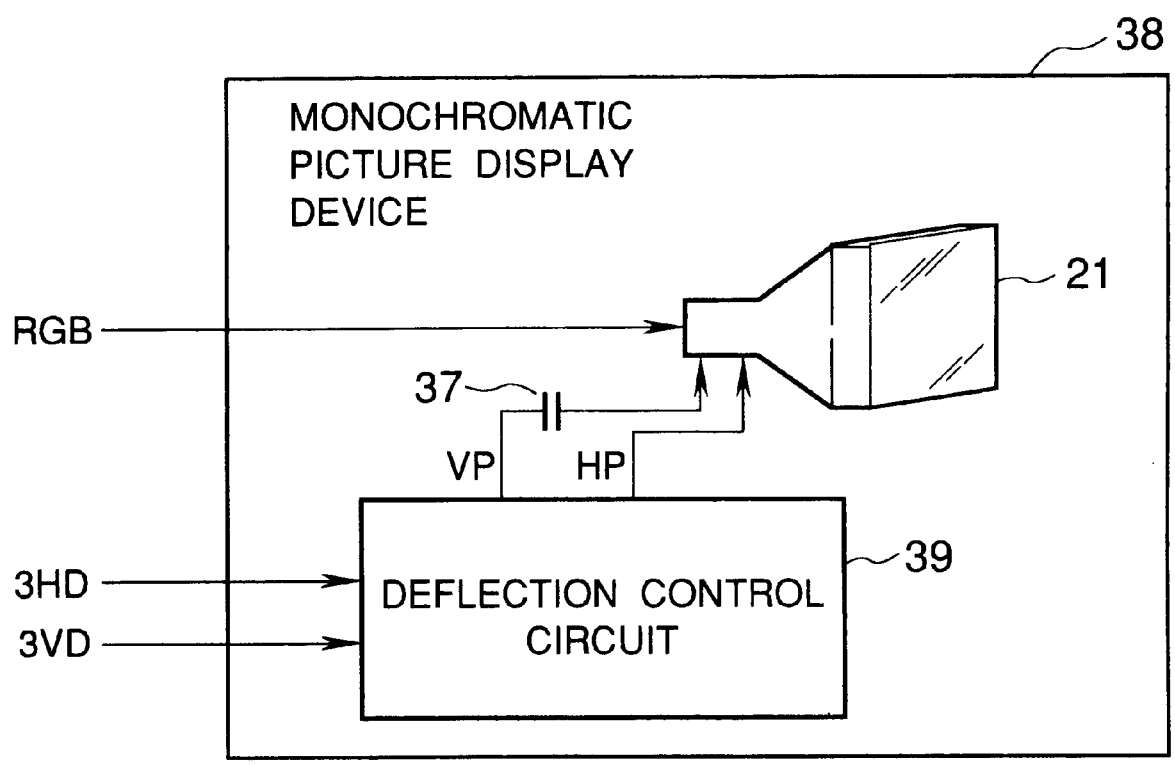
FIG. 11 is a block diagram showing a construction of a monochromatic picture display device 38 used in the second embodiment.

FIG. 11 is a block diagram showing a construction of a monochromatic picture display device 38 used in the second embodiment. As shown in FIG. 11, a deflection control circuit 39 is capacitively coupled to the monochromatic CRT 21 through the capacitor 37.

Figure 12:
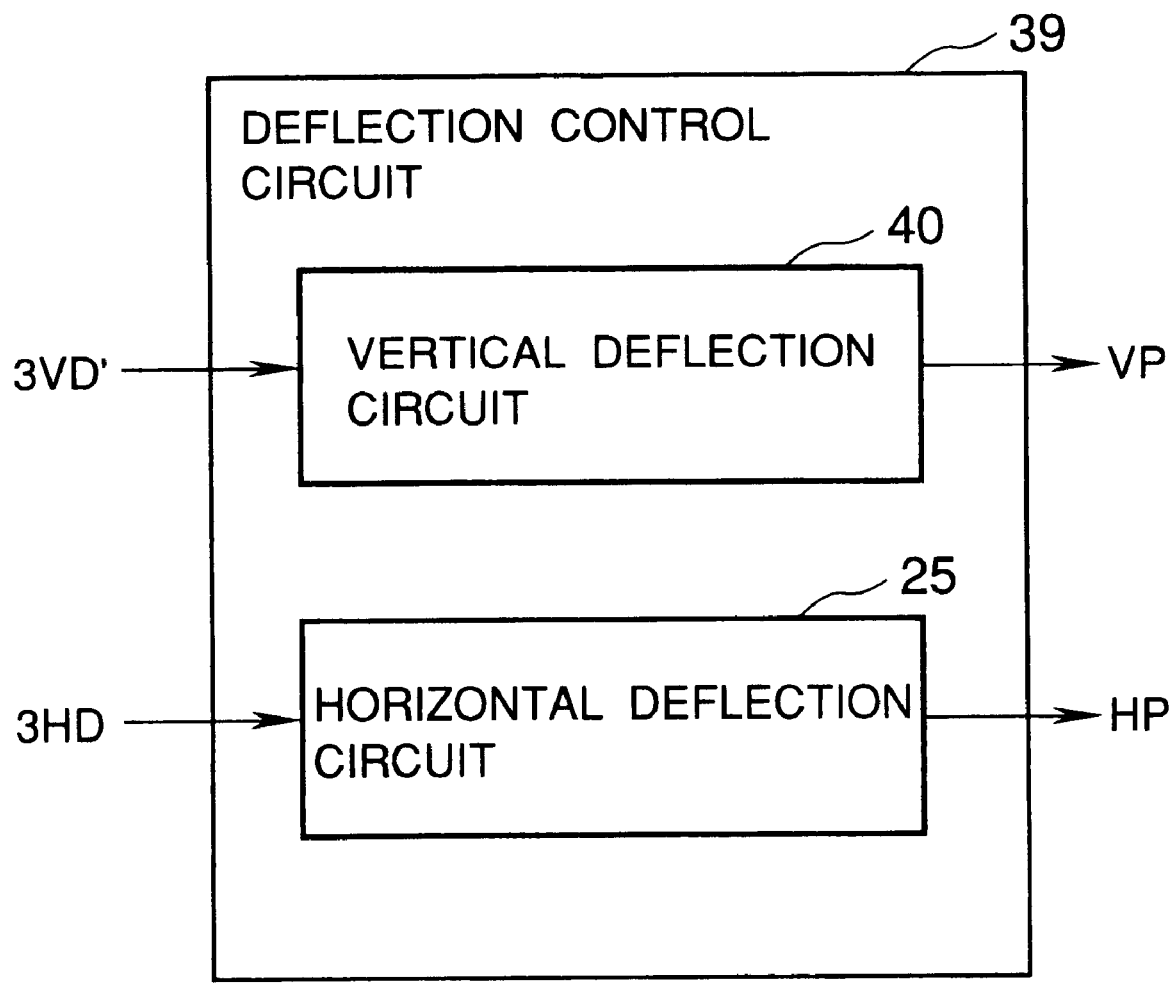
FIG. 12 is a block diagram showing a construction of the deflection control circuit 39 shown in FIG. 11.

FIG. 12 is a block diagram showing a construction of the deflection control circuit 39 shown in FIG. 11. As shown in FIG. 12, the deflection control circuit 39 has a vertical deflection circuit 40 and a horizontal deflection circuit 25.

Figure 13:
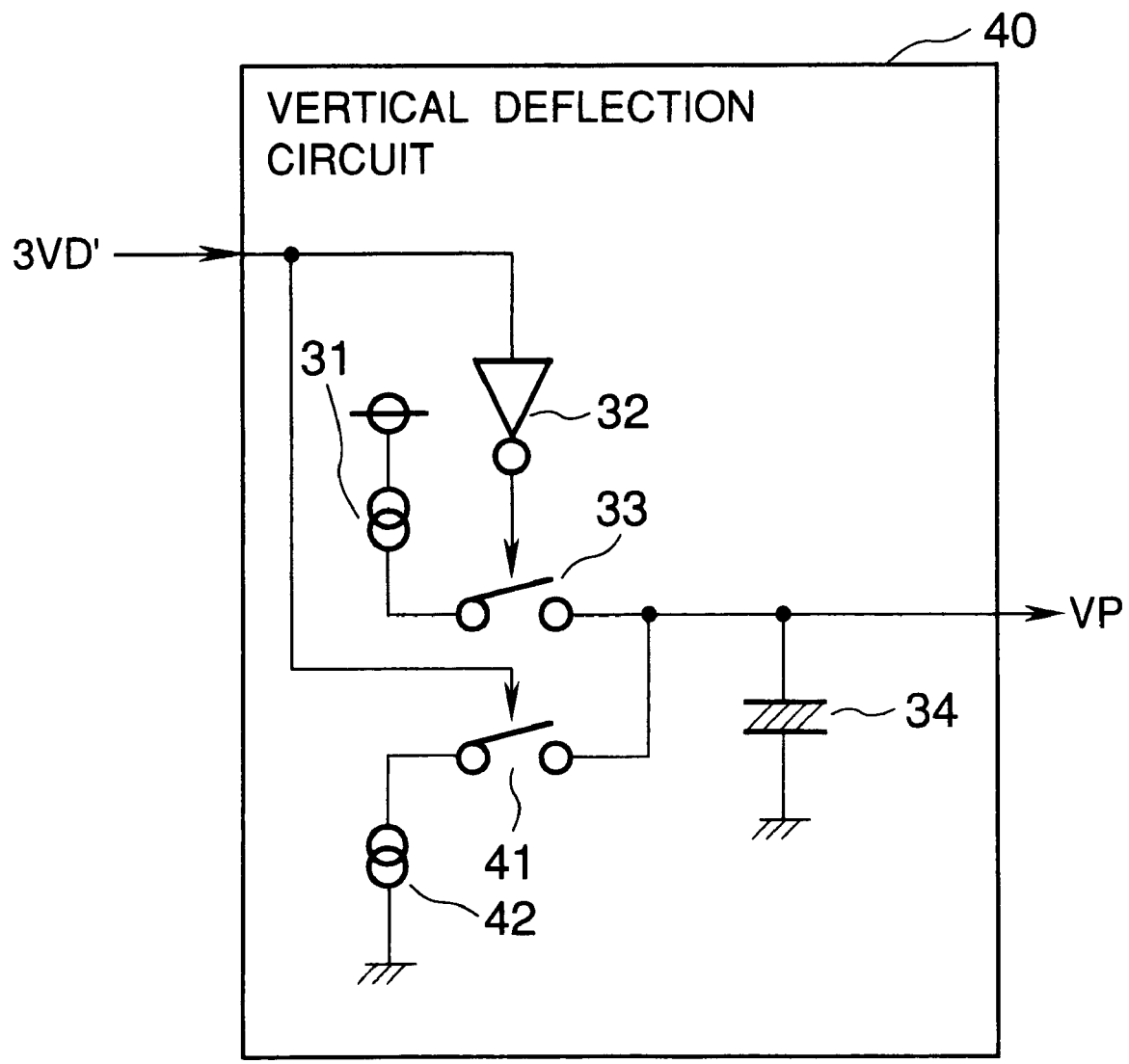
FIG. 13 is a circuit diagram of the vertical deflection circuit 40 shown in FIG. 12.

FIG. 13 is a circuit diagram of the vertical deflection circuit 40 shown in FIG. 12. As shown in FIG. 13, the vertical deflection circuit 40 has constant current sources 31 and 42, change-over switches 33 and 41, a capacitor 34 and an inverter 32.

Figure 14:
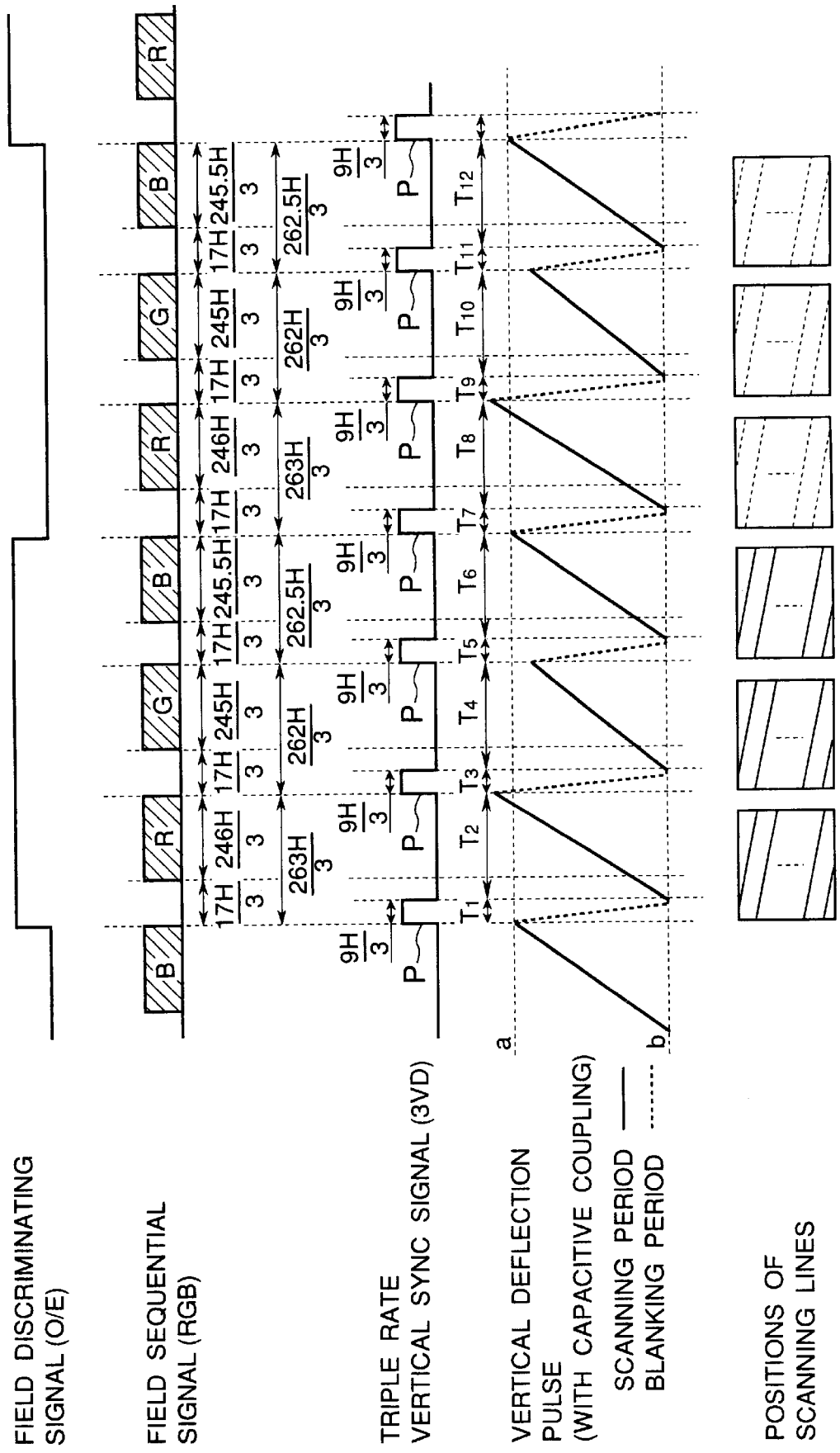
FIG. 14 is an explanatory diagram showing a relationship between a vertical deflection pulse P and the position of the scanning lines displayed on the monochromatic CRT 21 in the system for displaying a color picture according to the second embodiment.

FIG. 14 is an explanatory diagram showing a relationship between a vertical deflection pulse P and the position of the scanning lines displayed on the monochromatic CRT 21 in the system for displaying a color picture according to the second embodiment.

Next, the operation of the system for displaying a color picture according to the second embodiment will be described. In the second embodiment, the offset which occurs in the position of the scanning lines when a capacitive coupling is used in the first embodiment is corrected for, permitting the scanning lines to assume the same positions. The system of the second embodiment differs from those of the conventional system and the first embodiment in respect that the monochromatic picture display device 38 and the deflection control circuit 40 are constructed as shown in FIG. 13.

Since the vertical deflection circuit 40 is constructed in a manner illustrated in FIG. 13, when the change-over switch 33 is closed, the capacitor 34 is charged by a constant current flow from the constant current source 31. Alternatively, when the change-over switch 41 is closed, there occurs a constant current flow to the constant current source 42 by discharging the capacitor 34. The switch 33 is operated by the triple rate vertical sync signal 3VD' which is inverted by the inverter 32, and the switch 41 is operated by the triple rate vertical sync signal 3VD'. Thus, in this vertical deflection circuit 40, an original potential representing a scan beginning position can be rapidly restored during the blanking period with a constant rate, as illustrated in FIG. 14. Thus, the retrace line (shown in FIG. 14 by broken lines) returns to the position of b during the intervals $T_1$, $T_3$, $T_5$, $T_7$, $T_9$ and $T_{11}$, as shown in FIG. 14. Accordingly, if the vertical deflection pulse VP is averaged due to the capacitor 34, it is possible to begin a scanning operation substantially from a predetermined position. Thus, the offset in the position of the scanning lines which is experienced in the case shown in FIG. 9 and FIG. 10 can be prevented, maintaining the position of the scanning lines constant during each field.

In this manner, when the second embodiment is employed, if a capacitive coupling is employed, the scanning lines can be displayed on the same position, permitting a picture of a high quality and having a high vertical resolution to be displayed without a color breakup.

Except for the above described points, the second embodiment is the same as the first embodiment.

Third Embodiment

Figure 15:
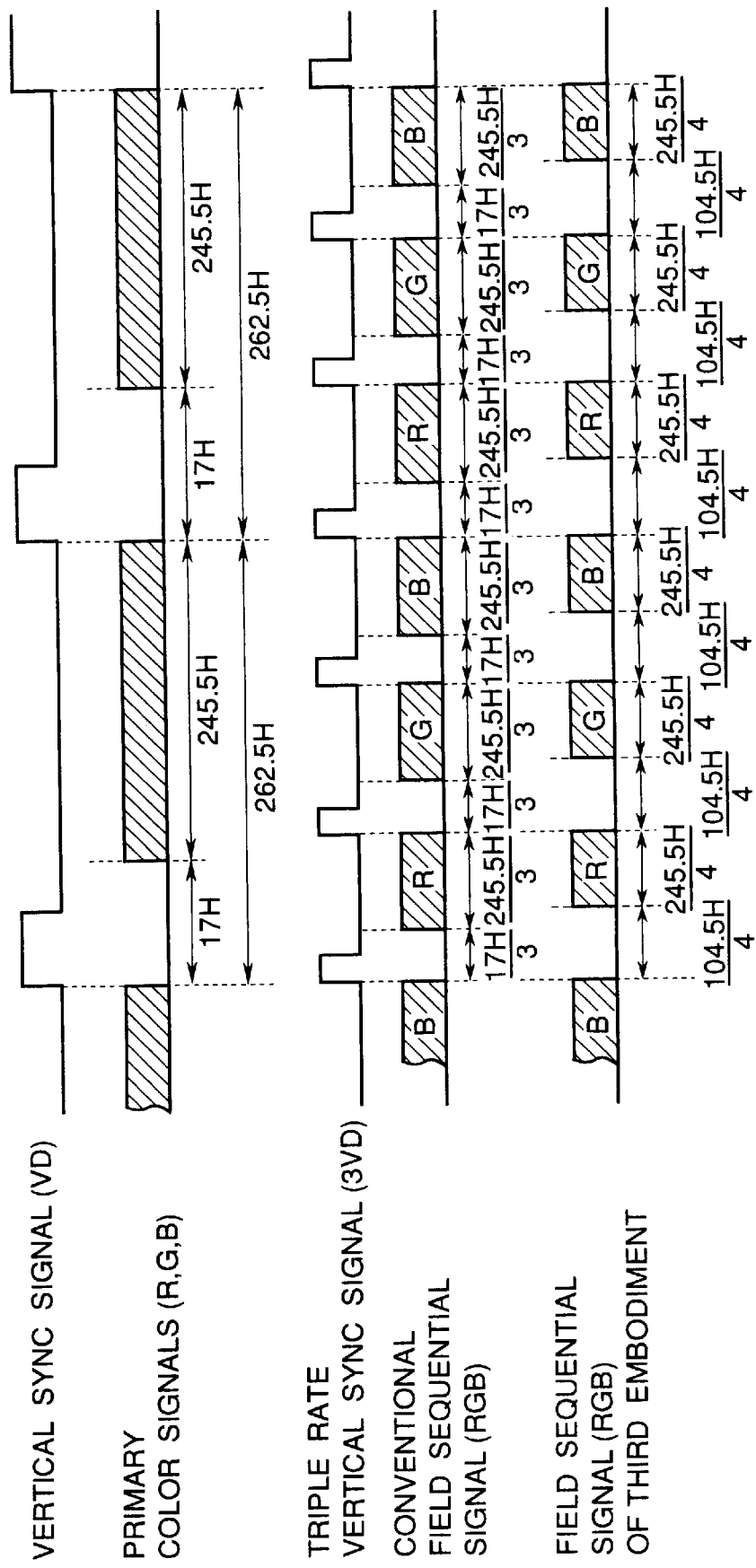
FIG. 15 is an explanatory diagram showing several signals occurring in a system for displaying a color picture according to a third embodiment of the present invention.

FIG. 15 is an explanatory diagram showing several signals occurring in a system for displaying a color picture according to a third embodiment of the present invention.

The operation of the system for displaying a color picture will be described below. In the third embodiment, a field sequential signal RGB is read out from a field sequential signal generator 1 (shown in FIG. 1) at a rate which is quadruple the rate with which primary color signals are inputted to the field sequential signal generator 1, and the field sequential signal RGB is read out only three times during the interval of one field, thereby increasing a length of time which is allotted to the sync signal. As shown in FIG. 15, picture signals (hatched portions) are displayed at the rate which is quadruple the rate at which the primary color signals are inputted.

Referring to FIG. 15, the number of horizontal sync signals begins to be counted in response to the rising edge of the triple rate vertical sync signal 3VD, and representing one count by 1 H, the field sequential signal is delivered at the count of 104.5 H/4. In this manner, a length of time allotted to the sync signal can be increased.

In comparison to the conventional system in which a length of time allotted to the sync signal is equal to 17/3 horizontal sync intervals (17 H/3), in the third embodiment, a corresponding length of time is equal to 104.5/4 horizontal sync intervals (104.5 H/4) as illustrated in FIG. 15, thus increasing the length of time allotted to the sync signal by a factor of nearly 4.6. By way of example, in the conventional arrangement, a length of time allotted to the sync signal of NTSC signal is 360 [$\mu$s], and the corresponding length of time in the third embodiment is equal to 1.66 [ms].

In the conventional arrangement, when a coloring device including a color filter is used, it is necessary to cause the light from the display screen to pass through a color filter section having the same color as the picture signal. Considering that the display screen may be viewed from above or below, a certain margin in the vertical direction is required for the color filter, and an accuracy is required for the tracking operation of a motor on which the color filter is mounted. Several color filter sections are applied together, there is a need for an overlap width between the sections, and this results in a time interval during which no coloring effect occurs. In addition, a coloring device, which utilizes a liquid crystal shutter, requires a time interval on the order from 1 to several milliseconds to switch between adjacent colors, which could not have been provided by a length of time alone which is allotted to the sync signal.

An increased length of time which is allotted to the sync signal according to the third embodiment is effective to overcome these problems. For example, if there is a degree of offset in the tracking operation of the color filter with respective to the picture being displayed, a color picture display is still enabled. Thus, if the color filter includes a juncture of an increased size, a color picture display is still enabled by the length of time which is allotted to the sync signal. The increased length of time allotted to the sync signal also eliminates the inconvenience that several liquid crystal shutters must be provided because of an increased length of time which is needed to switch between the liquid crystal shutters, thus allowing a single liquid crystal shutter to be used.

Except for the above-described points, the third embodiment is the same as the first embodiment.

Fourth Embodiment

Figure 16:
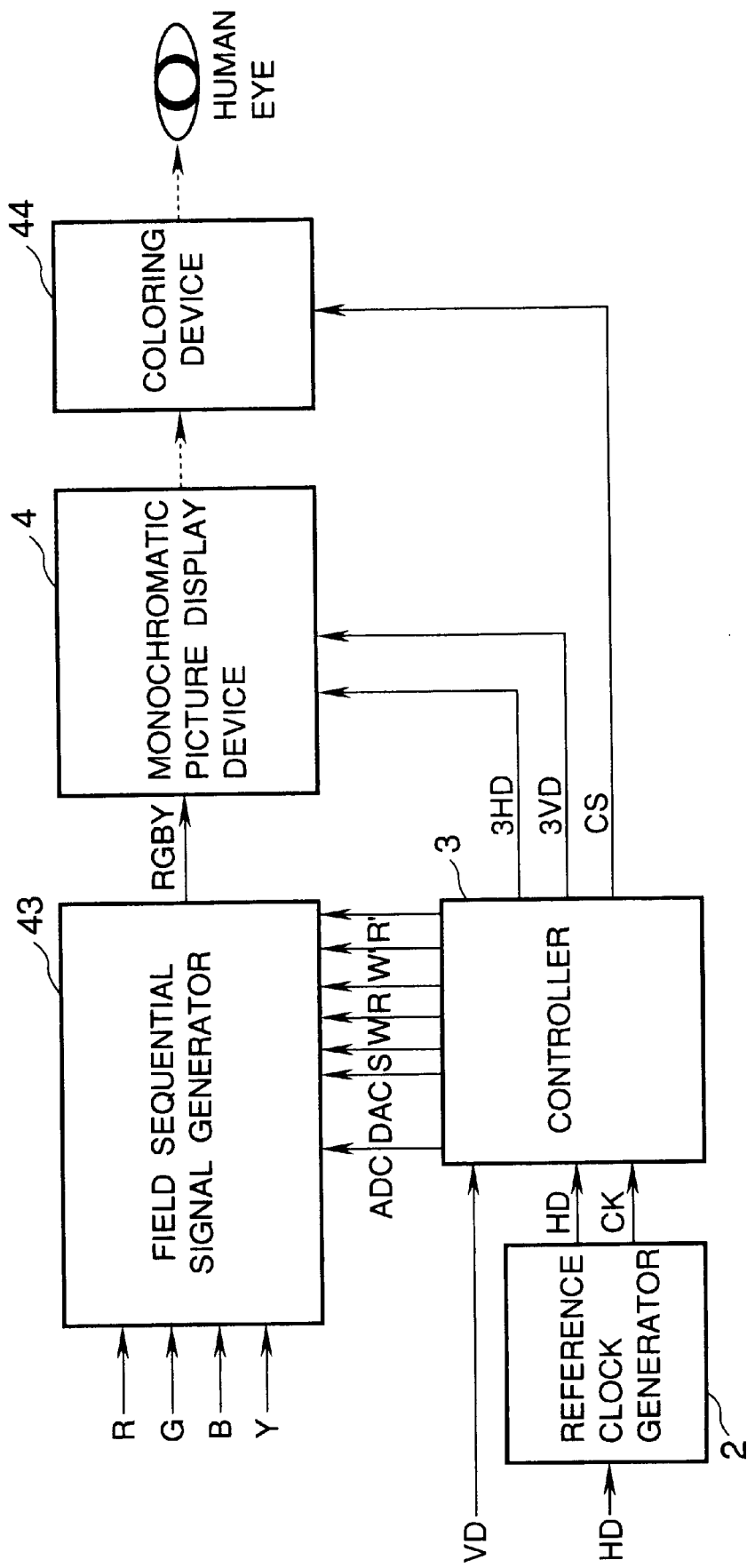
FIG. 16 is a block diagram schematically showing a construction of a system for displaying a color picture according to a fourth embodiment of the present invention.
Figure 17:
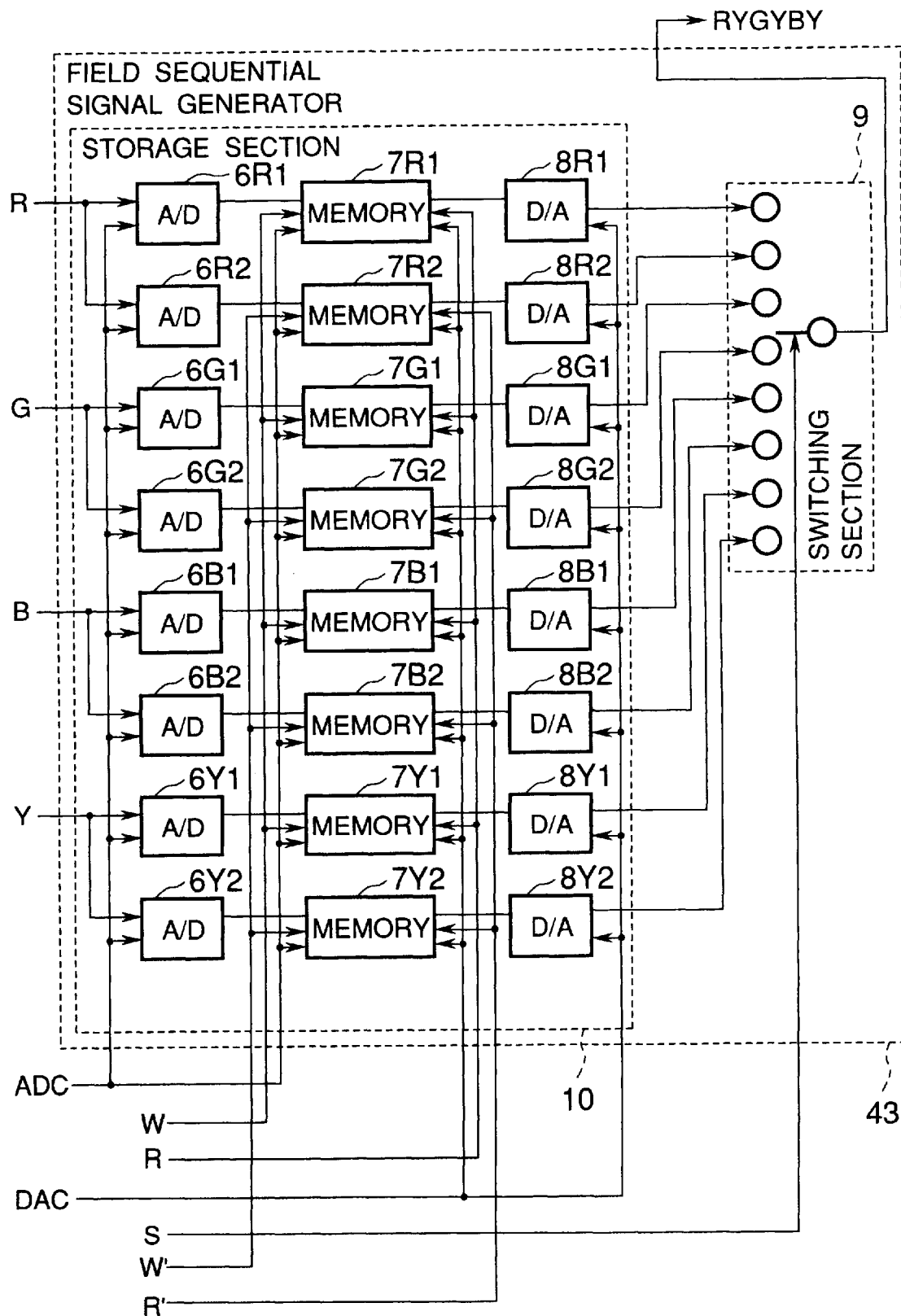
FIG. 17 is a block diagram schematically showing a field sequential signal generator 43 shown in FIG. 16.
Figure 18:
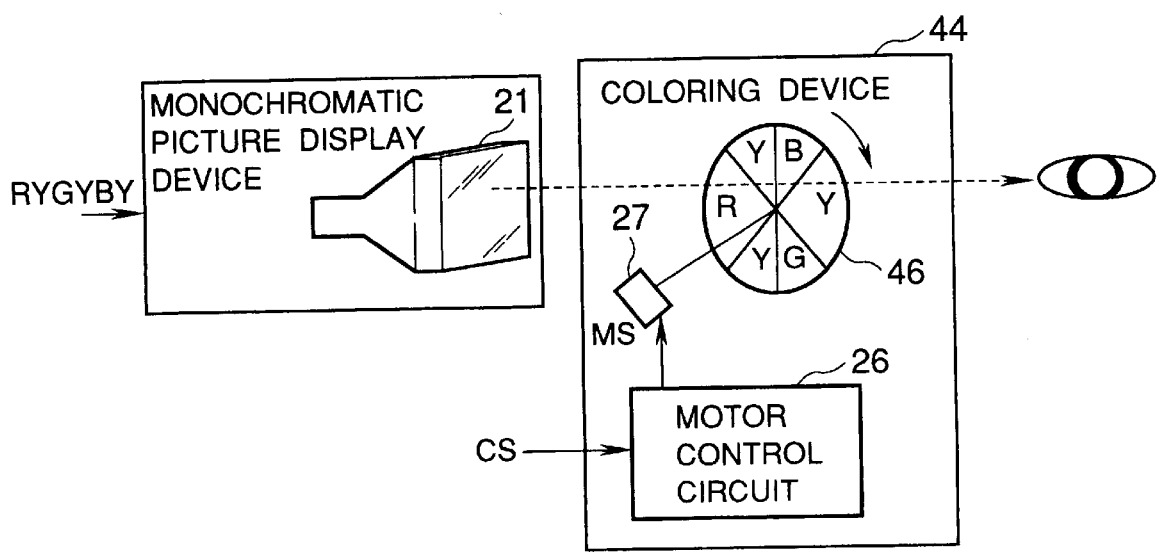
FIG. 18 is a schematic view of a coloring device 44 shown in FIG. 16.
Figure 19:
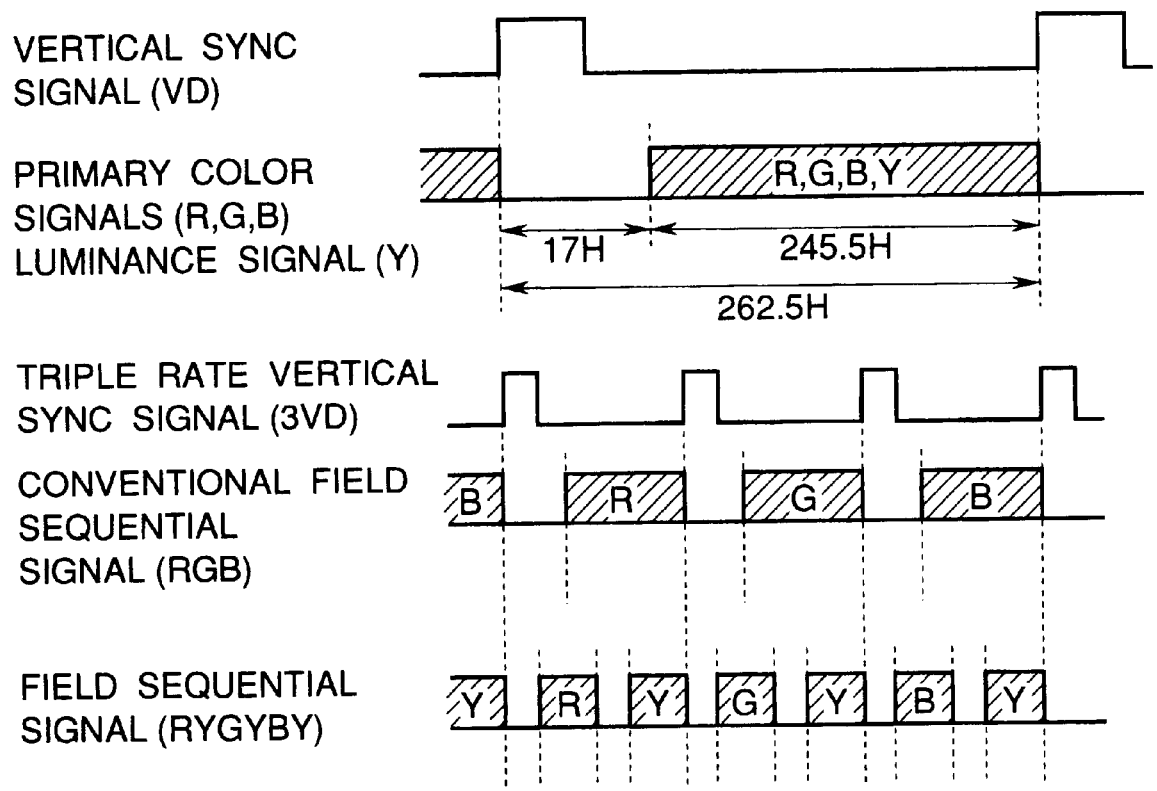
FIG. 19 is a series of timing charts of a field sequential signal RYGYBY used in the coloring device 44 shown in FIG. 18 in comparison to a field sequential signal RGB used in the conventional coloring device 5 shown in FIG. 27.

FIG. 16 is a block diagram schematically showing a construction of a system for displaying a color picture according to a fourth embodiment of the present invention. FIG. 17 is a block diagram schematically showing a field sequential signal generator 43 shown in FIG. 16, FIG. 18 is a schematic view of a coloring device 44 shown in FIG. 16, and FIG. 19 is a series of timing charts of a field sequential signal RYGYBY used in the coloring device 44 shown in FIG. 18 in comparison to a field sequential signal RGB used in the conventional coloring device 5 shown in FIG. 27.

Referring to FIG. 16 and FIG. 17, in the fourth embodiment, in addition to the primary color signals R, G and B, a luminance signal Y is inputted to the field sequential signal generator 43. Referring to FIG. 17, the field sequential signal generator 43 of the fourth embodiment includes, in addition to the conventional arrangement shown in FIG. 23, A/D converters 6Y1 and 6Y2, memories 7Y1 and 7Y2, and D/A converters 8Y1 and 8Y2 for use with the luminance signal Y.

Next, the operation of the system for displaying a color picture according to the fourth embodiment will be described.

Referring to FIG. 16, the field sequential signal generator 43 receives and stores the signal including three primary color signals R, G and B and the luminance signal Y at a first rate, and outputs a field sequential signal RYGYBY at a second rate which is a sextuple the first rate. More specifically, the field sequential signal RYGYBY is outputted by repeating the sequence of R, Y, G, Y, B and Y, as illustrated in FIG. 19. The timing at which the field sequential signal RYGYBY is outputted is determined by counting a time interval from the rising edge of the triple rate vertical sync signal 3VD to the appearance of the field sequential signal RYGYBY in a counter, and by changing a time interval between successive vertical sync pulses of the vertical sync signals in the vertical frequency converter 120 of FIG. 3 in order to control the position of the scanning lines.

Referring to FIG. 18, portions of a rotary filter 46 of the coloring device 44, which correspond to the luminance signals, are not applied with color filters. Accordingly, light from the display screen which corresponds to the luminance signal does not experience an attenuation through the color filter, thus improving the luminance. This provides a compensation for the brightness and reduces a flickering.

By way of example, assuming that the brightness is reduced substantially to the half level by the color filter when white is displayed, in the conventional arrangement illustrated in FIG. 27, the ratio of transmitted light is calculated as indicated below $(\frac{1}{3}+\frac{1}{3}+\frac{1}{3}) \times (\frac{1}{2}) = 0.5$ where $(\frac{1}{3}+\frac{1}{3}+\frac{1}{3})$ denotes the sum of the light intensity of each of three primary colors R, G and B, and ½ denotes a transmittance of the color filter.

In contrast, in the fifth embodiment illustrated in FIG. 20, the ratio of transmitted light is calculated as indicated below $\{(\frac{1}{6}+\frac{1}{6}+\frac{1}{6}) \times (\frac{1}{2})\} + (\frac{1}{6}+\frac{1}{6}+\frac{1}{6}) = 0.75$ where $(\frac{1}{6}+\frac{1}{6}+\frac{1}{6})$ denotes the sum of the light intensity of each of three primary colors R, G and B, ½ denotes a transmittance of the color filter, and $(\frac{1}{6}+\frac{1}{6}+\frac{1}{6})$ occurring secondly in the equation denotes the sum of the light intensity of the luminance light Y.

The comparison of the above values 0.5 and 0.75 indicates that the brightness can be improved in the system according to the fourth embodiment.

Further, when displaying an NTSC signal, for example, an increased area within the memory may be used for the luminance signal from the field sequential signal generator 1 to enhance the horizontal resolution, while a reduced area within the memory may be used for the color signal which does not contribute to the resolution, thus achieving a saving in the memory capacity and providing a high resolution inexpensively.

In the above description, the use of three primary color signals R, G and B and the luminance signal Y has been described, but the rate of display and the types of color signals are not limited thereto.

Also, in the above description, the use of three primary color signals R, G and B and the luminance signal Y in the conventional system for displaying a color picture as illustrated in FIG. 22 to FIG. 30 has been described, but the arrangement of the fourth embodiment may be applied to any one of the first to third embodiments.

Fifth Embodiment

Figure 20:
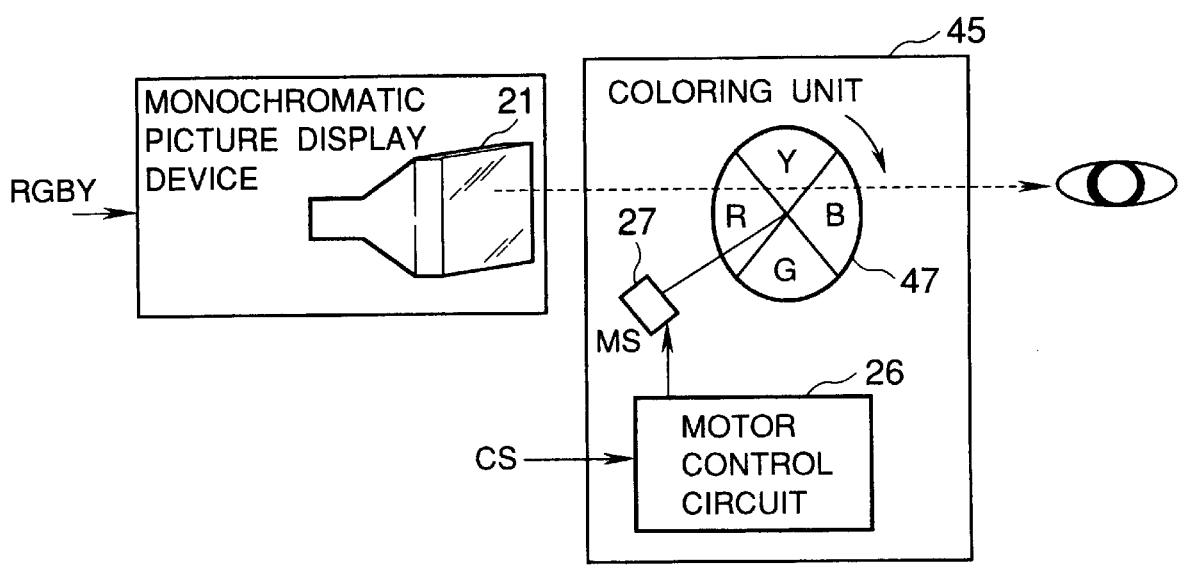
FIG. 20 is a schematic view showing a construction of a coloring device 45 used in a system for displaying a color picture according to a fifth embodiment of the present invention.
Figure 21:
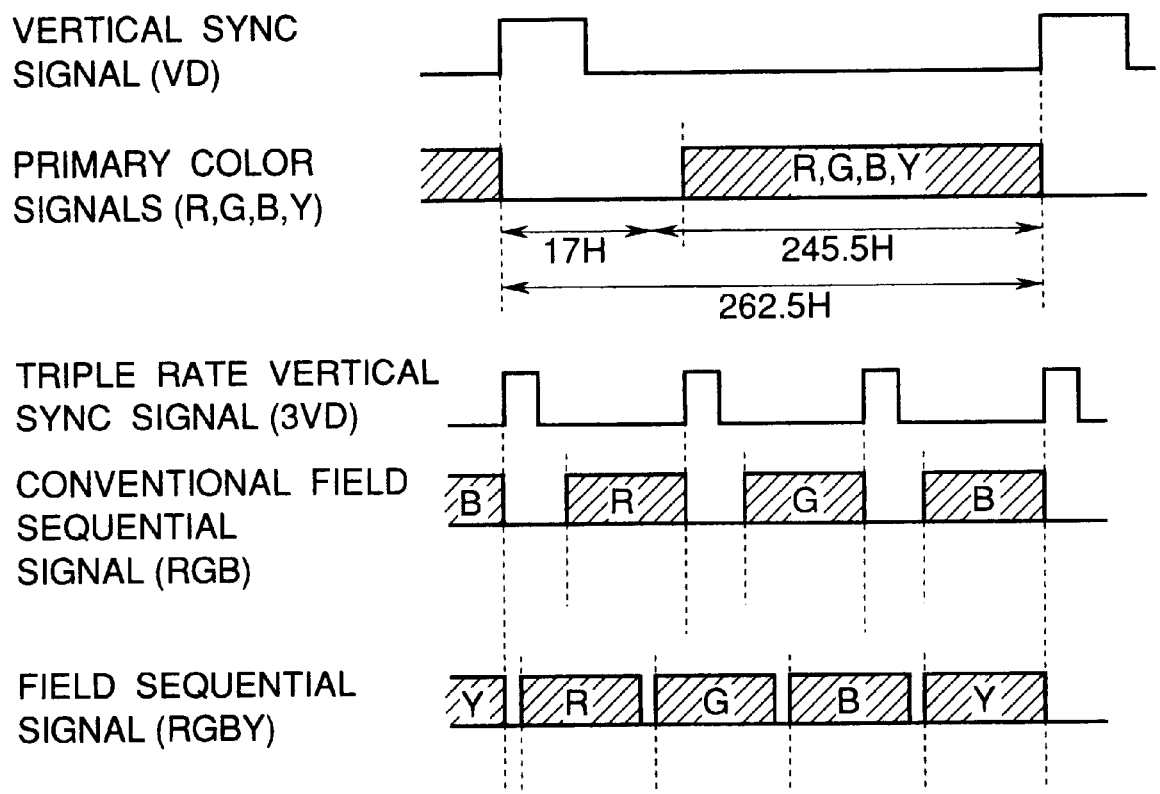
FIG. 21 is a series of timing charts illustrating a field sequential signal RGBY used in a coloring device 45 shown in FIG. 20 in comparison to a field sequential signal RGB used in the conventional coloring device 5 shown in FIG. 27.
Figure 22:
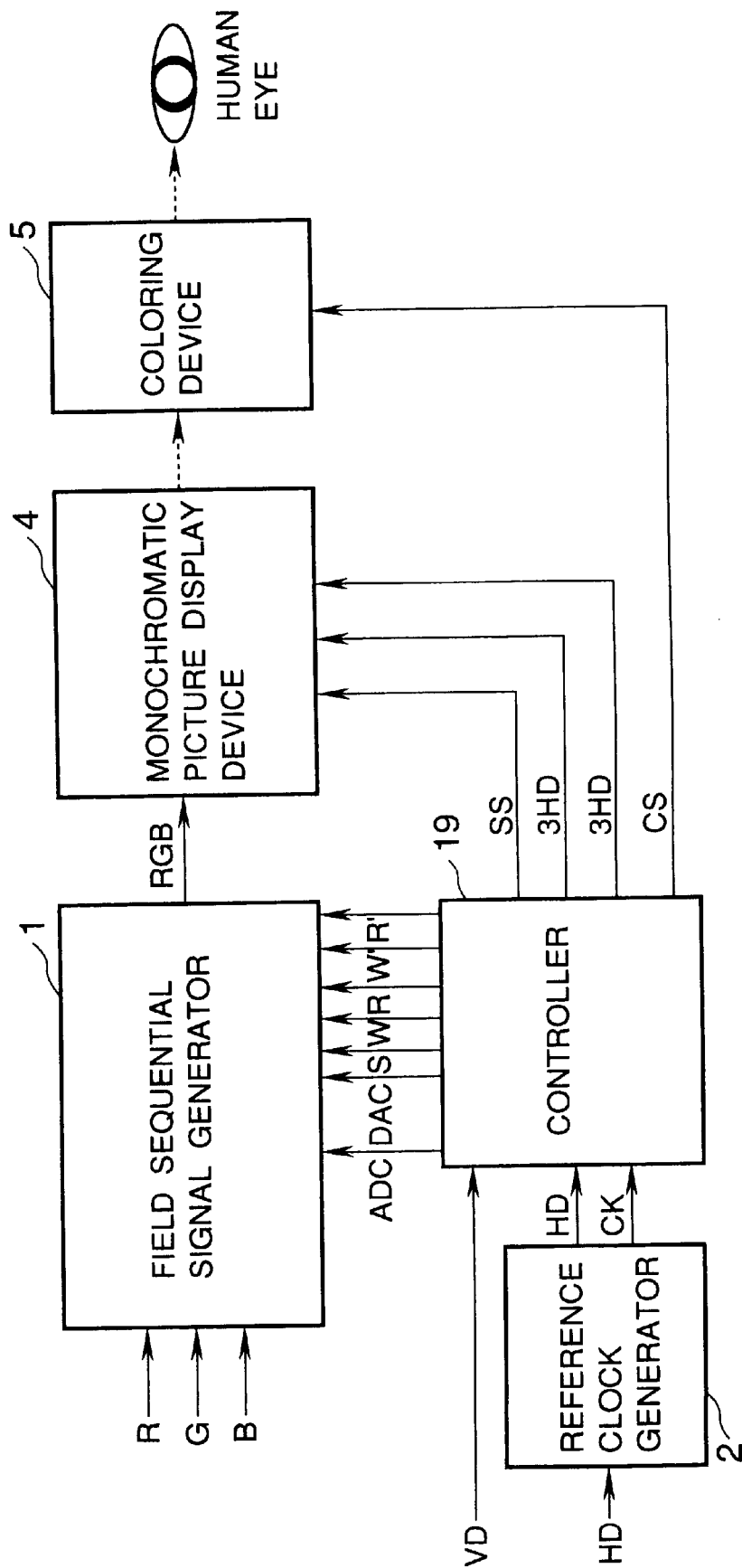
FIG. 22 is a block diagram schematically showing a construction of the above-mentioned prior art system.
Figure 27:
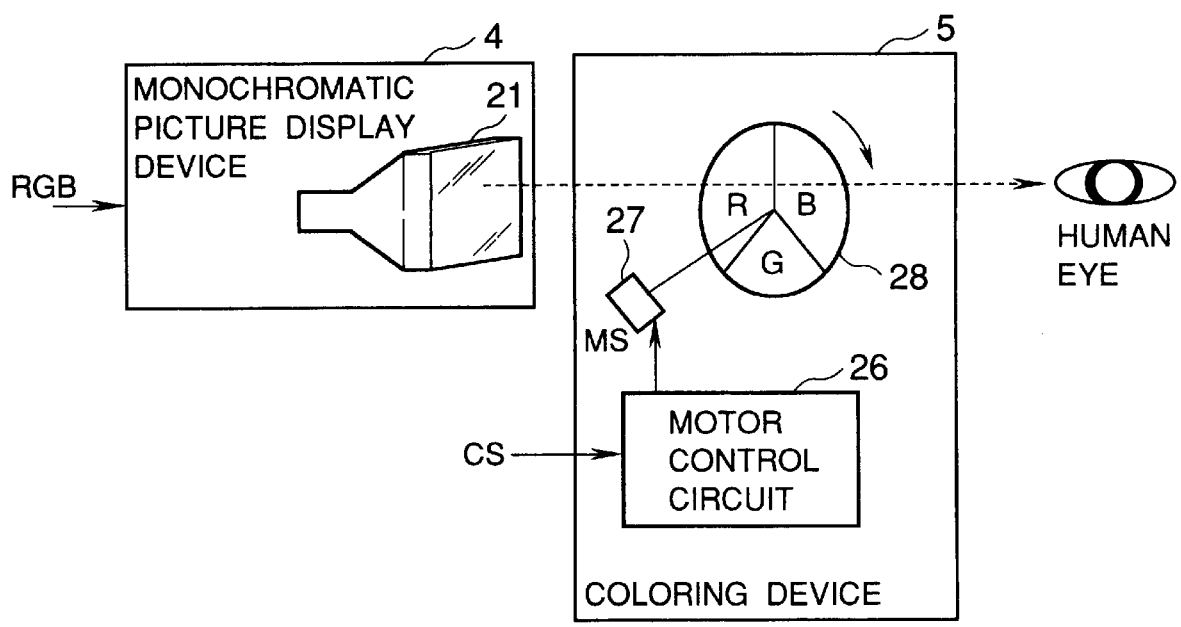
FIG. 27 is a schematic view of a coloring device of FIG. 22.
Figure 28A:
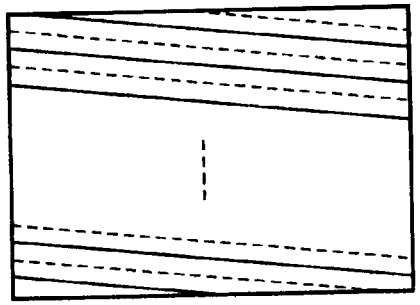
FIGS. 28A and 28B are explanatory diagrams showing different scanning schemes used in the television art.
Figure 28B:
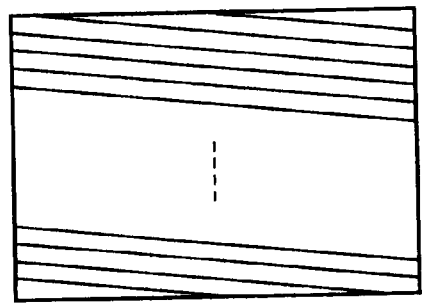
Figure 29A:
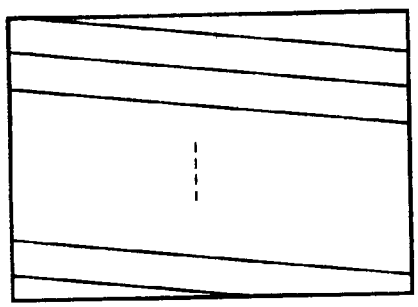
FIGS. 29A and 29B are explanatory diagrams showing an interlace scanning.
Figure 29B:
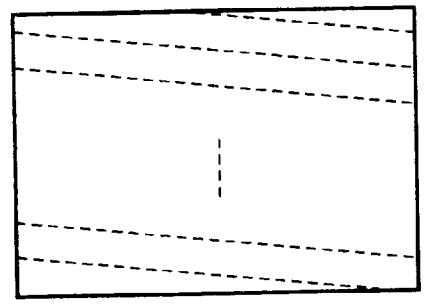
Figure 30:
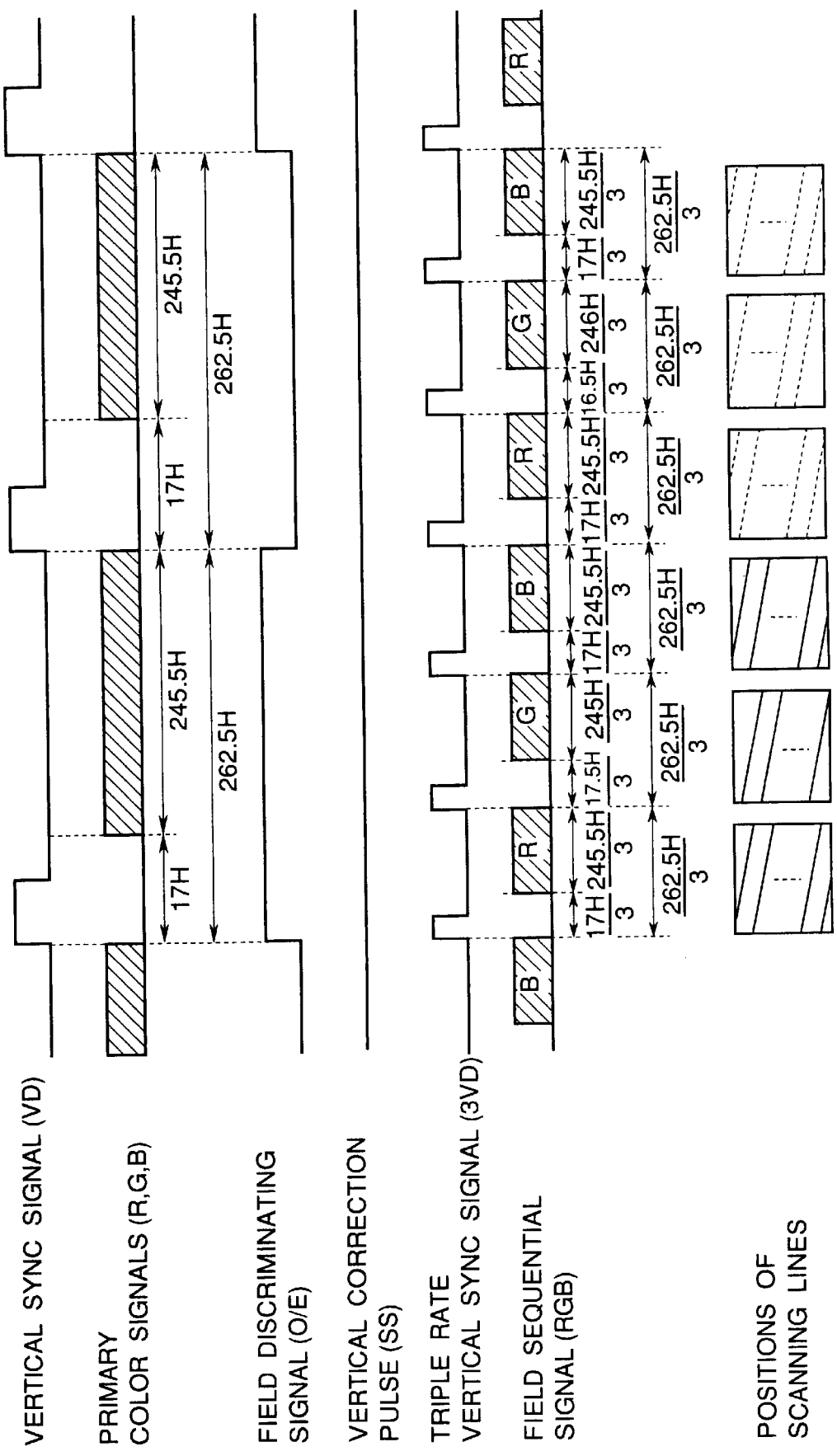
FIG. 30 is an explanatory diagram showing the timings of various signals appearing in the prior art system and the position of the scanning lines on the monochromatic picture display device when the vertical correction pulse SS is not inputted.
Figure 31:
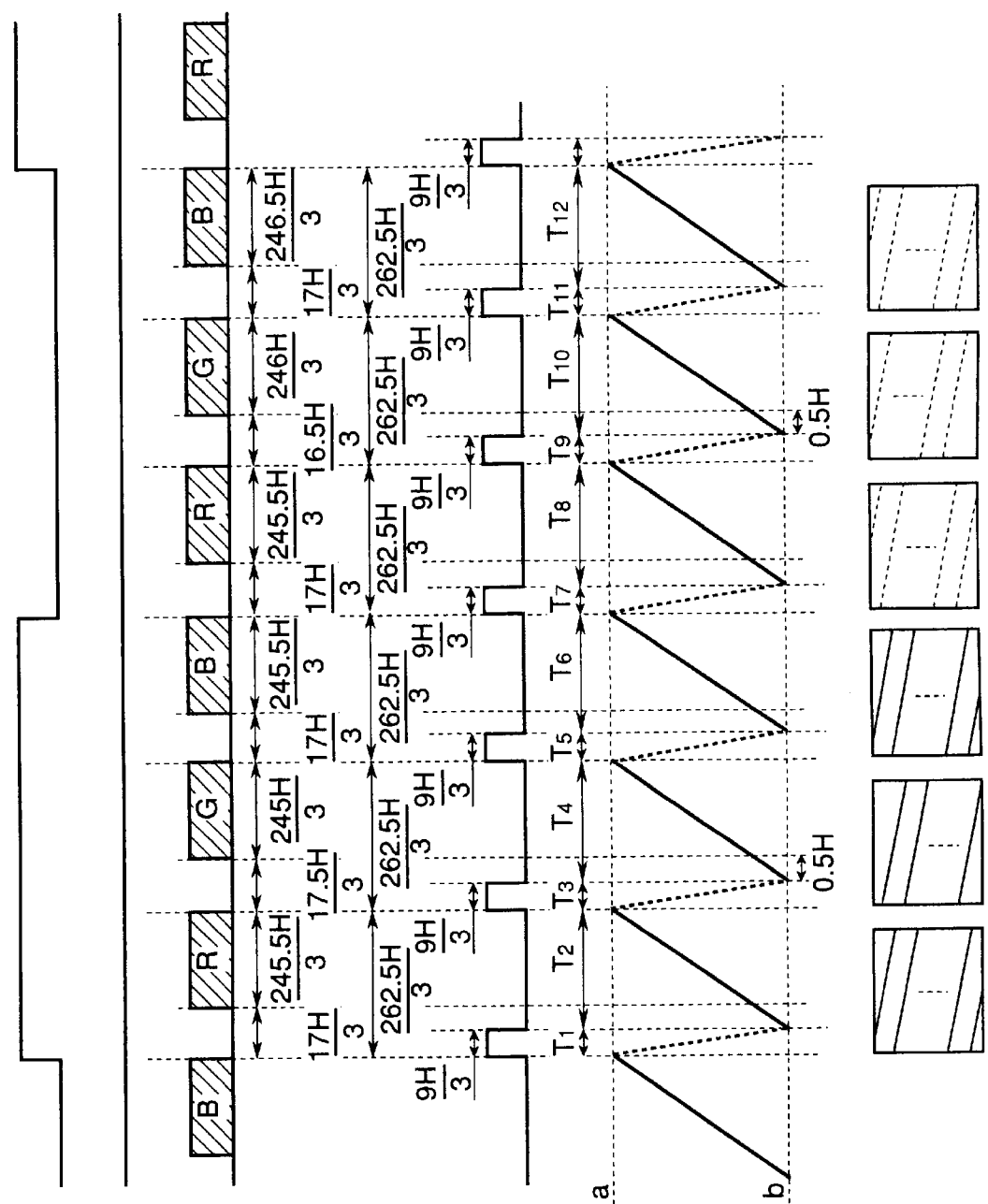
FIG. 31 is an explanatory diagram showing the vertical deflection pulses and the position of the scanning lines on the monochromatic picture display device when the vertical correction pulse SS is not inputted.

FIG. 20 is a schematic view showing a construction of a coloring device 45 used in a system for displaying a color picture according to a fifth embodiment of the present invention, and FIG. 21 is a series of timing charts illustrating a field sequential signal RGBY used in a coloring device 45 shown in FIG. 20 in comparison to a field sequential signal RGB used in the conventional coloring device 5 shown in FIG. 27.

The system for displaying a color picture of the fifth embodiment differs from that of the fourth embodiment only in respect of the fact that the field sequential signal RGBY from the field sequential signal generator 43 is delivered in the sequence of R, G, B and Y.

Referring to FIG. 20, a portion of a rotary filter 47 of the coloring device 45, which corresponds to the luminance signal Y, is not applied with a color filter. As a consequence, light from the display screen 21 which is produced in response to the luminance signal Y is not attenuated by the color filter of the rotary filter 47, thus improving the brightness.

This provides a compensation for the brightness and reduces a flickering in the similar manner as in the fourth embodiment.

By way of example, assuming that the color filter provides an attenuation of light to substantially half value when white is displayed, in the conventional arrangement illustrated in FIG. 27, the ratio of transmitted light is calculated as indicated below $(\frac{1}{3}+\frac{1}{3}+\frac{1}{3}) \times (\frac{1}{2}) = 0.5$ where $(\frac{1}{3}+\frac{1}{3}+\frac{1}{3})$ denotes the sum of the light intensity of each of three primary colors R, G and B, and ½ denotes a transmittance of the color filter.

In contrast, in the fifth embodiment illustrated in FIG. 20, the ratio of transmitted light is calculated as indicated below $\{(\frac{1}{4}+\frac{1}{4}+\frac{1}{4}) \times (\frac{1}{2})\} + \frac{1}{4} = 0.625$ where $(\frac{1}{4}+\frac{1}{4}+\frac{1}{4})$ denotes the sum of the light intensity of each of three primary colors R, G and B, ½ denotes a transmittance of the color filter, and ¼ occurring lastly in the equation denotes the light intensity of the luminance light Y.

The comparison of the above values 0.5 and 0.625 indicates that the brightness can be improved in the system according to the fifth embodiment.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A system for displaying a color picture, comprising:

field sequential signal generating means for receiving and storing a color picture signal, including a plurality of signal components per field, at a first rate and sequentially sending said plurality of signal components, as a field sequential signal, at a second rate which is higher than the first rate;

picture display means for displaying a monochromatic picture based on the plurality of signal components sent from said field sequential signal generating means at the second rate;

coloring means for coloring light emitted from said monochromatic picture displayed on said picture display means; and control means for sending a vertical sync signal, which includes a plurality of vertical sync pulses corresponding to the plurality of signal components respectively, to said picture display means;

said control means controlling a timing at which each of the plurality of vertical sync pulses is sent to said picture display means by selecting a vertical sync signal from among a signal with a period equal to one-third a triple-rate vertical sync interval or a triple-rate vertical sync signal that is delayed for a period of time equal to one-half the period of a horizontal sync signal,;

wherein the respective time intervals between when the plurality of vertical sync pulses are sent from said control means to said picture display means and when the signal components are sent from said field sequential signal generating means to said picture display means are equal and the period between said plurality of vertical sync pulses varies according to the selected vertical sync signal.

2. A system of claim 1, wherein the second rate is an integral multiple n of the first rate, where n is an integer equal to or greater than 2.

3. A system of claim 1, wherein the signal components are primary color signals.

4. A system of claim 1, wherein the signal components are primary color signals and a luminance signal.

5. A system of claim 2, wherein:

n is equal to 3;

the signal components are three primary color signals; and said control means controls the timing at which each of the vertical sync pulses is sent to said picture display means in such a way that a phase difference equal to one-sixth a horizontal sync signal interval is provided between the vertical sync pulses during an even field and the vertical sync pulses during an odd field, thereby causing said picture display means to perform an interlace scanning.

6. A system of claim 1, wherein said picture display means includes:

a cathode ray tube;

a deflection control circuit for applying a vertical deflection pulse which is based on the vertical sync signal to said cathode ray tube;

a capacitor for capacitively coupling said cathode ray tube and said deflection control circuit; and discharge means for forcibly discharging a charge from said capacitor.

7. A system of claim 1, wherein the respective time intervals between when the vertical sync pulse is sent from said control means to said picture display means and when the signal component is sent from said field sequential signal generating means to said picture display means are greater than a blanking interval.

8. A method for displaying a color picture, comprising:

receiving and storing a color picture signal, which includes a plurality of signal components per field, in a field sequential signal generating means at a first rate;

sending a vertical sync signal, which includes a plurality of vertical sync pulses corresponding to the plurality of signal components respectively, from a control means to a picture display means;

sequentially sending the plurality of signal components, as a field sequential signal, from the field sequential signal generating means to the picture display means at a second rate which is higher than the first rate, thereby displaying a monochromatic picture based on the plurality of signal components on the picture display means;

coloring light emitted from the monochromatic picture displayed on the picture display means; and controlling a timing at which each of the plurality of vertical sync pulses is sent to the picture display means by selecting a vertical sync signal from among a signal with a period equal to one-third a triple-rate vertical sync interval or a triple-rate vertical sync signal that is delayed for a period of time equal to one-half the period of a horizontal sync signal,;

wherein the respective time intervals between when the plurality of vertical sync pulses are sent from the control means to the picture display means and when the signal components are sent from the field sequential signal generating means to the picture display means are equal and a period between the plurality of vertical sync pulses varies according to the selected vertical sync signal.

9. A method of claim 8, wherein said second rate is an integral multiple n of said first rate, where n is an integer equal to or greater than 2.

10. A method of claim 8, wherein said signal components are primary color signals.

11. A method of claim 8, wherein said signal components are primary color signals and a luminance signal.

12. A method of claim 9, wherein:

n is equal to 3;

said signal components are three primary color signals; and said control means controls said timing at which each of said vertical sync pulses is sent to said picture display means in such a way that a phase difference equal to one-sixth a horizontal sync signal interval is provided between said vertical sync pulses during an even-numbered field and said vertical sync pulses during an odd-numbered field, thereby causing said picture display means to perform an interlace scanning.

13. A method of claim 8, wherein said picture display means includes:

a cathode ray tube;

a deflection control circuit for applying a vertical deflection pulse which is based on said vertical sync signal to said cathode ray tube;

a capacitor for capacitively coupling said cathode ray tube and said deflection control circuit; and a discharge means for forcibly discharging a charge from said capacitor.

14. A method of claim 8, wherein said respective time intervals between when said vertical sync pulse is sent from said control means to said picture display means and when said signal component is sent from said field sequential signal generating means to said picture display means are greater than a blanking interval.

15. A system for displaying a color picture, comprising:

a field sequential signal generator, said field sequential signal generator receiving a color signal including a plurality of signal components per field at a first rate and transmitting the plurality of signal components as a field sequential signal at a second rate which is higher than the first rate;

a picture display apparatus operatively connected to said field sequential signal generator for displaying a monochromatic picture based on the plurality of signal components transmitted from said field sequential signal generator;

a coloring apparatus operatively connected to said picture display apparatus for coloring light emitted by said picture display apparatus; and a controller operatively connected to said coloring apparatus, said picture display apparatus, and said field sequential signal generator for controlling the display of the monochromatic picture by selecting a vertical sync signal from among a signal with a period equal to one-third a triple-rate vertical sync interval or a triple-rate vertical sync signal that is delayed for a period of time equal to one-half the period of a horizontal sync signal.

16. The system of claim 15, wherein the respective time intervals between when the plurality of vertical sync pulses are sent from said controller to said picture display apparatus and when the signal components are sent from said field sequential signal generator to said picture display apparatus are equal and a period of time between said plurality of vertical sync pulses varies according to the selected vertical sync signal.

17. The system of claim 16 wherein the plurality of signal components are three primary color signals; and said controller controls a timing at which each of the vertical sync pulses is sent to said picture display apparatus such that a phase difference equal to one-sixth a horizontal sync signal interval is provided between an odd field and an even field in the field sequential signal.

18. The system of claim 15, wherein said controller controls a time between when the vertical sync pulses are sent to said picture display apparatus and between when the field sequential signal components are sent to said picture display apparatus so that it is greater than a blanking interval.

* * * * *